Aug. 21, 1945.　　　R. E. RUNDELL　　　2,383,017
BOWLING PIN SETTING MACHINE CONTROL MECHANISM
Filed June 28, 1941　　　11 Sheets-Sheet 1
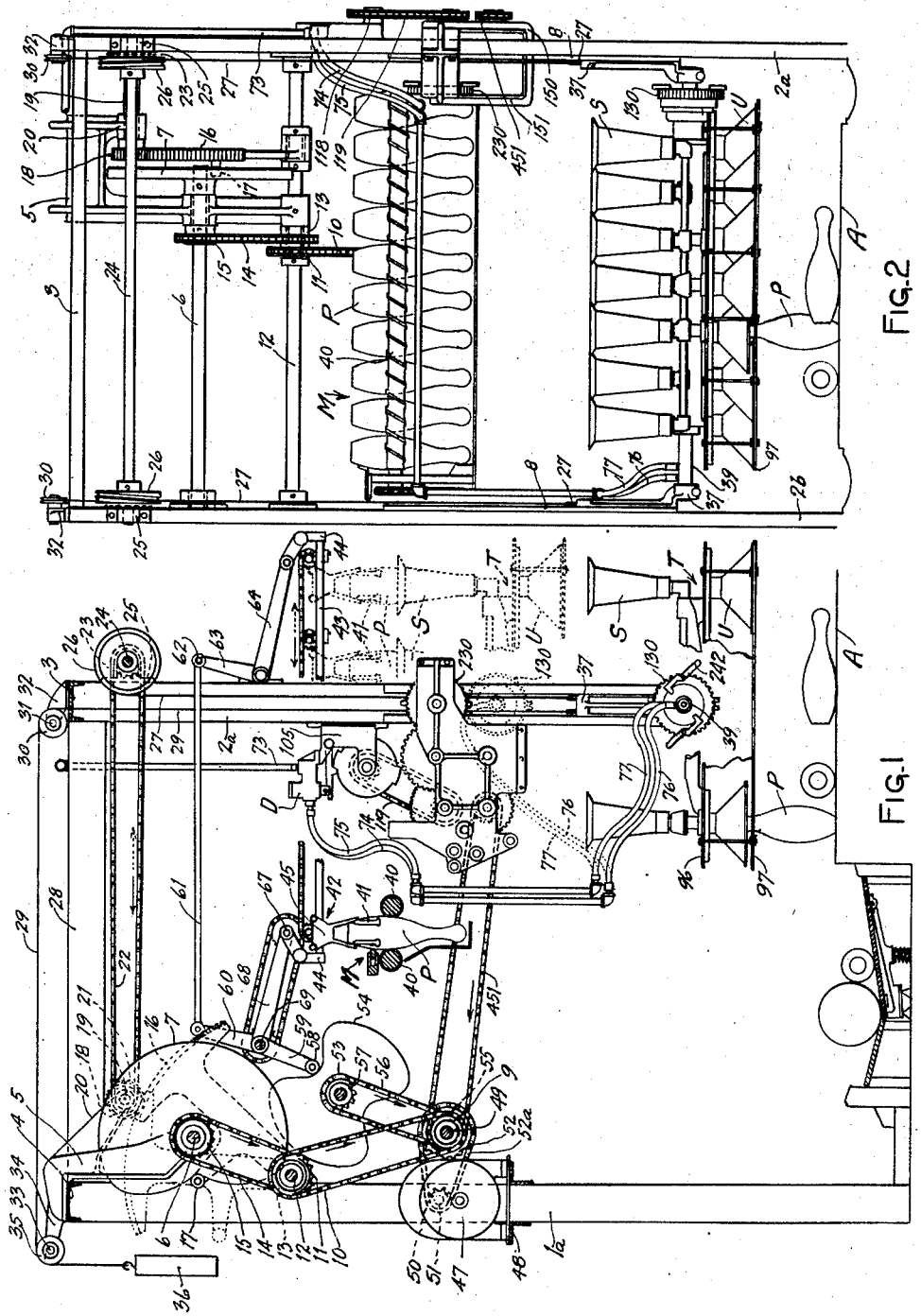
INVENTOR
RUPERT E. RUNDELL
BY Georges Hastings
ATTORNEY

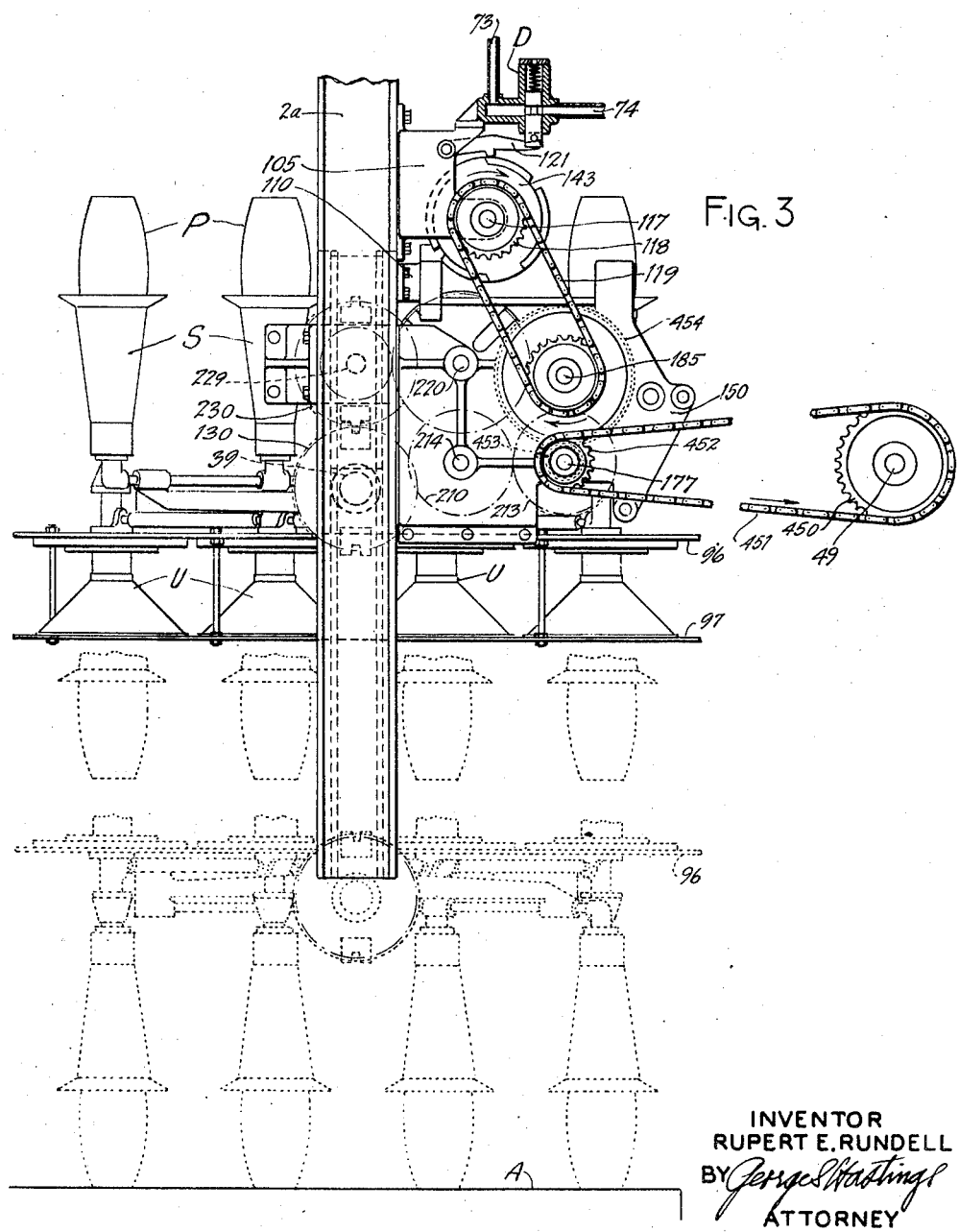

Aug. 21, 1945.  R. E. RUNDELL  2,383,017
BOWLING PIN SETTING MACHINE CONTROL MECHANISM
Filed June 28, 1941  11 Sheets-Sheet 3
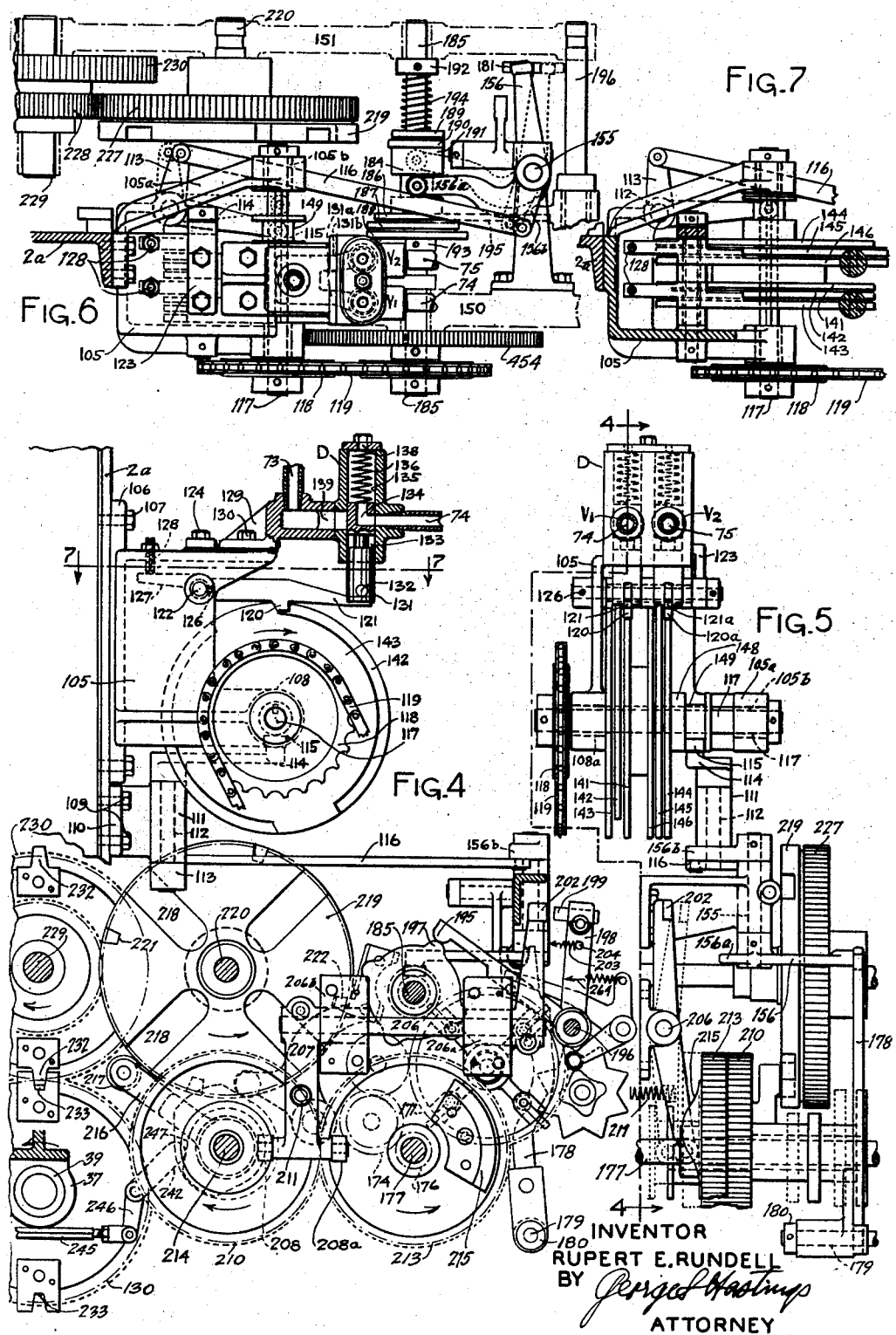
INVENTOR
RUPERT E. RUNDELL
BY
ATTORNEY Aug. 21, 1945.                R. E. RUNDELL                2,383,017
              BOWLING PIN SETTING MACHINE CONTROL MECHANISM
                    Filed June 28, 1941      11 Sheets-Sheet 4
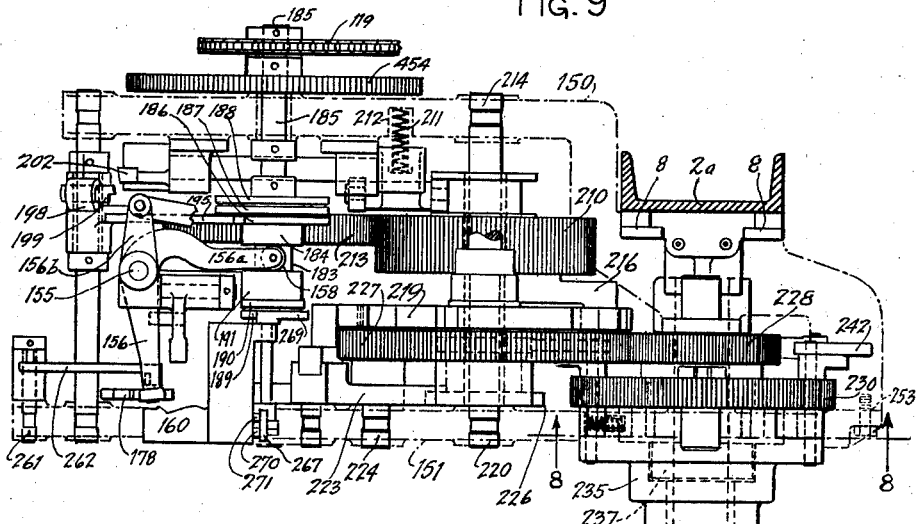
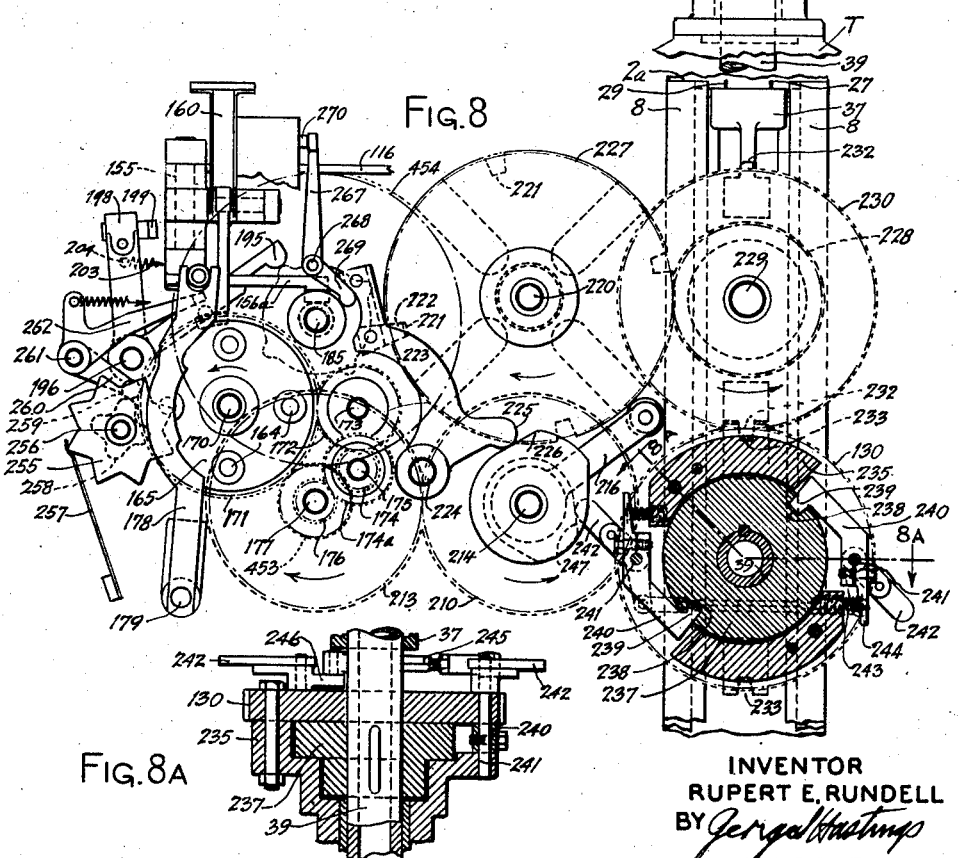
INVENTOR
RUPERT E. RUNDELL
BY
ATTORNEY Aug. 21, 1945.   R. E. RUNDELL   2,383,017
BOWLING PIN SETTING MACHINE CONTROL MECHANISM
Filed June 28, 1941   11 Sheets-Sheet 5

INVENTOR
RUPERT E. RUNDELL
BY
ATTORNEY

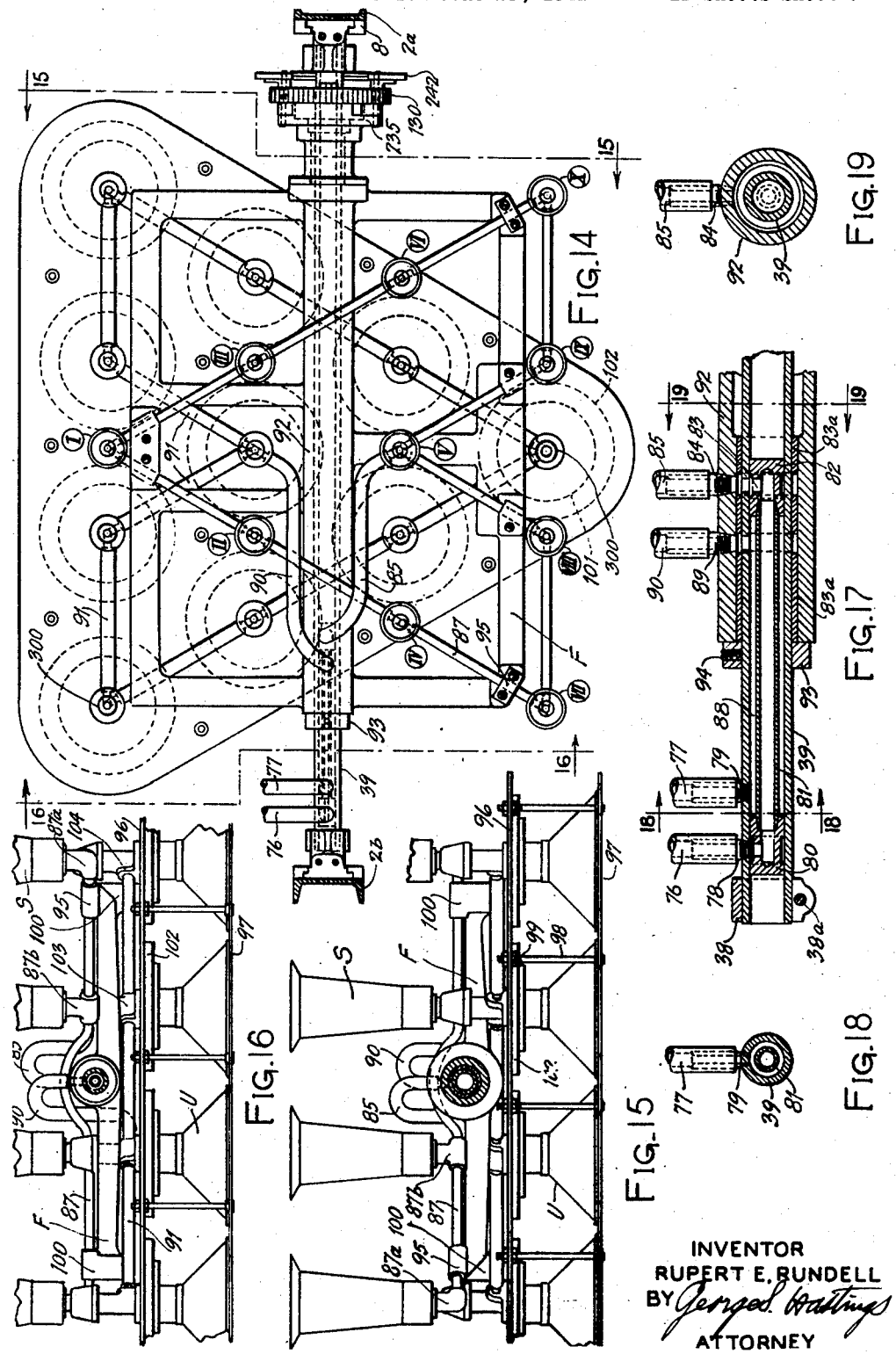

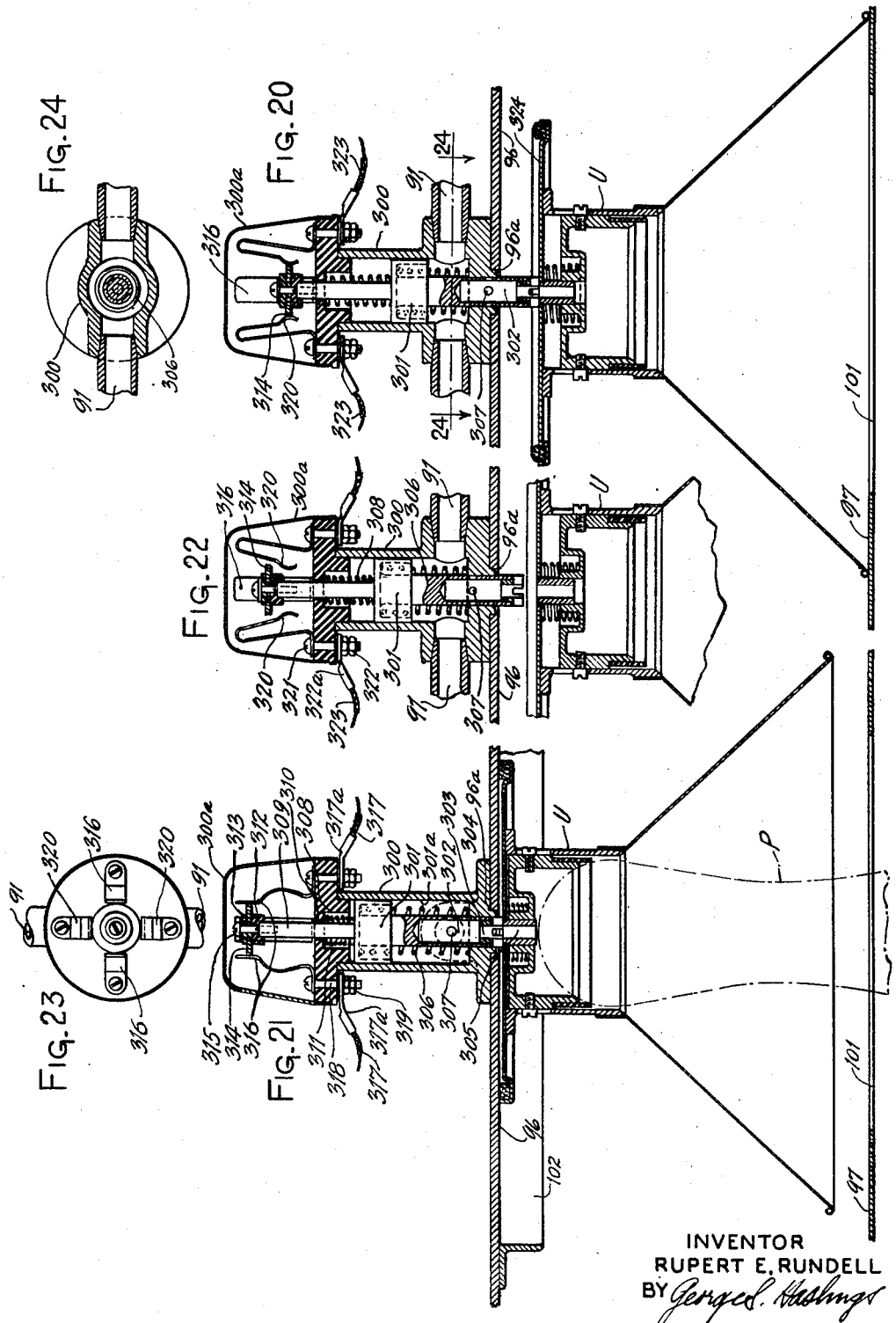

Aug. 21, 1945.　　　R. E. RUNDELL　　　2,383,017
BOWLING PIN SETTING MACHINE CONTROL MECHANISM
Filed June 28, 1941　　11 Sheets-Sheet 8
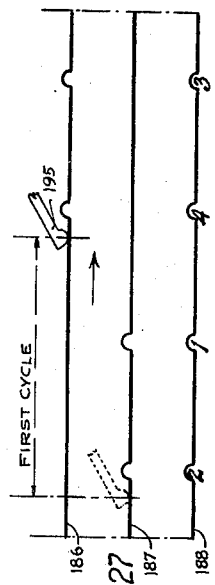
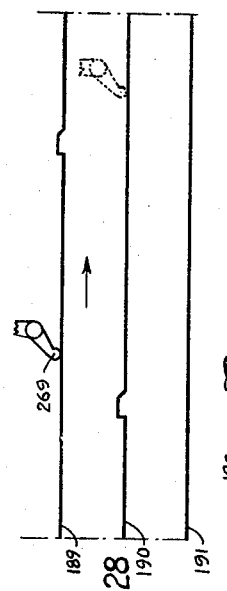
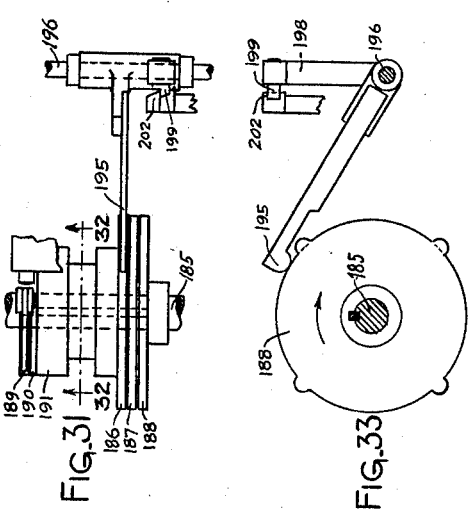
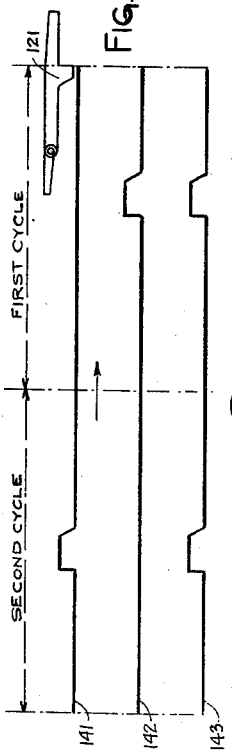
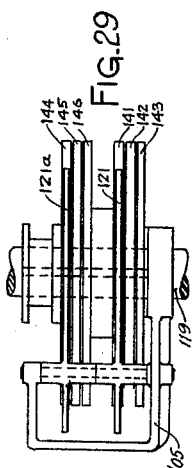
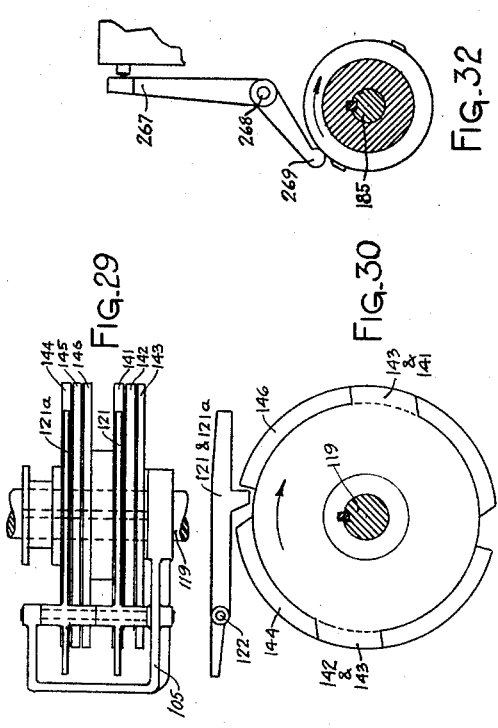
INVENTOR
RUPERT E. RUNDELL
BY *George S. Hastings*
ATTORNEY

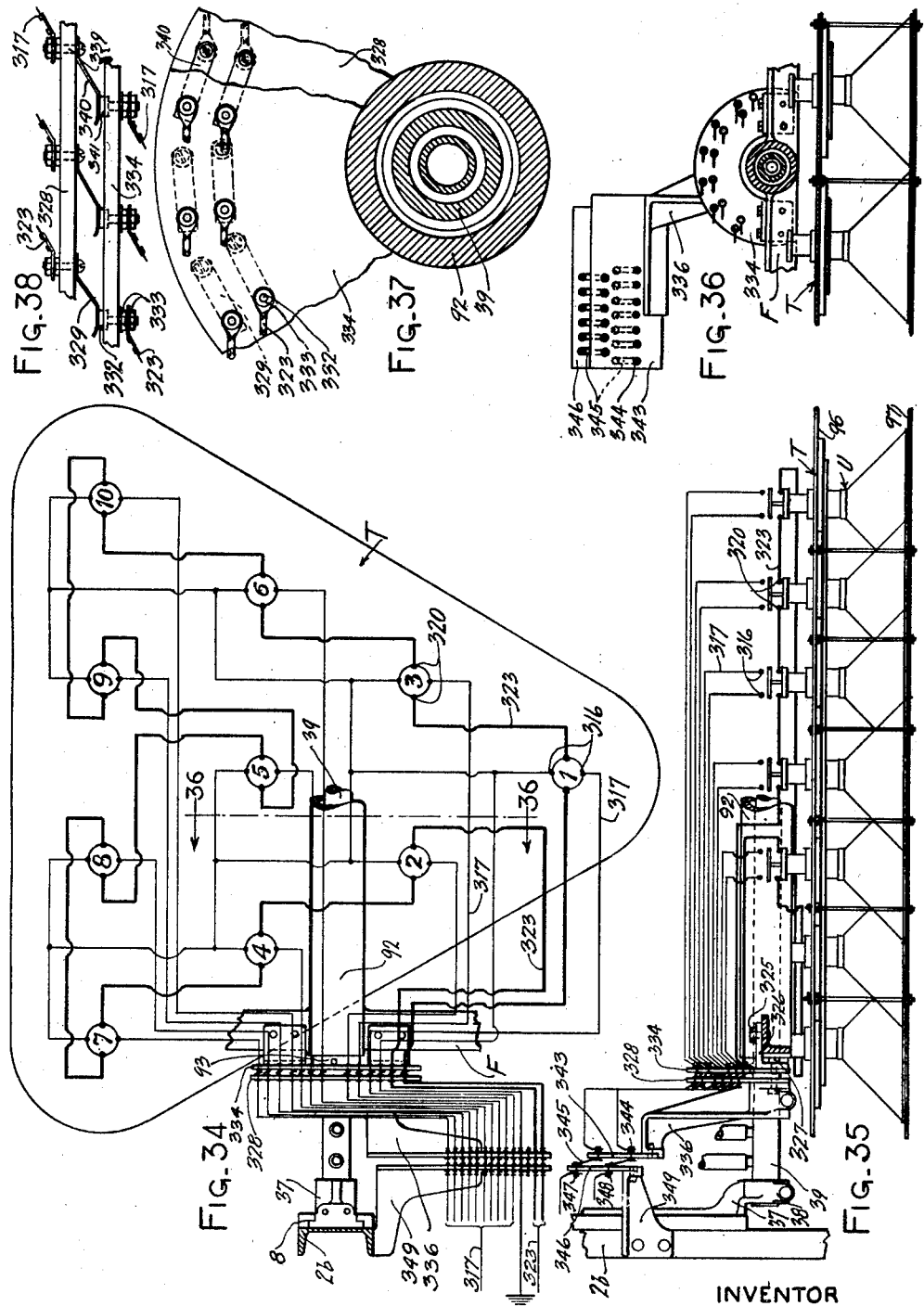

Aug. 21, 1945.   R. E. RUNDELL   2,383,017
BOWLING PIN SETTING MACHINE CONTROL MECHANISM
Filed June 28, 1941    11 Sheets-Sheet 10

INVENTOR
RUPERT E. RUNDELL
BY *George S. Hastings*
ATTORNEY

Aug. 21, 1945.          R. E. RUNDELL          2,383,017
BOWLING PIN SETTING MACHINE CONTROL MECHANISM
Filed June 28, 1941          11 Sheets-Sheet 11
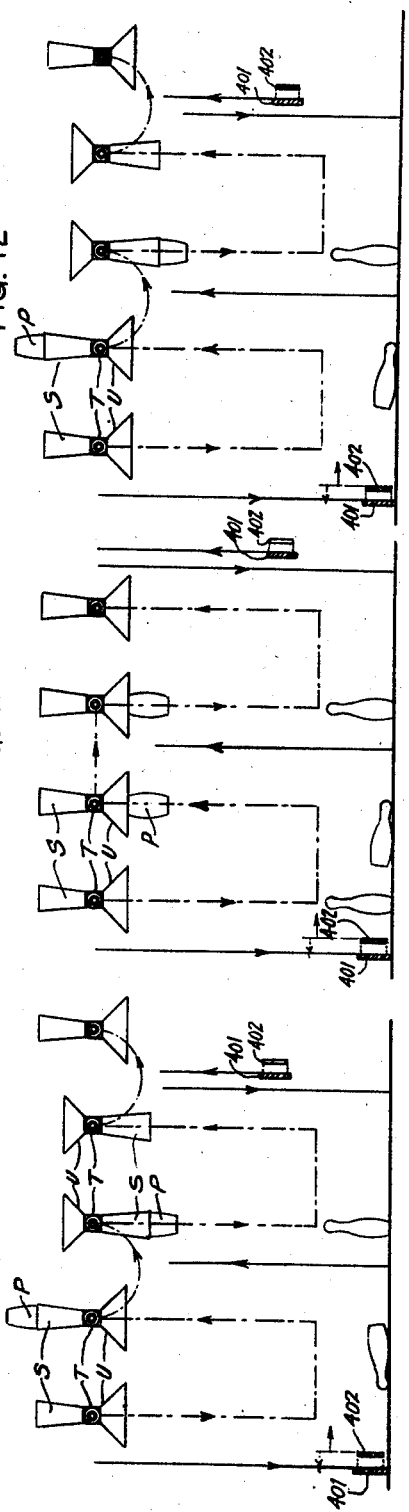
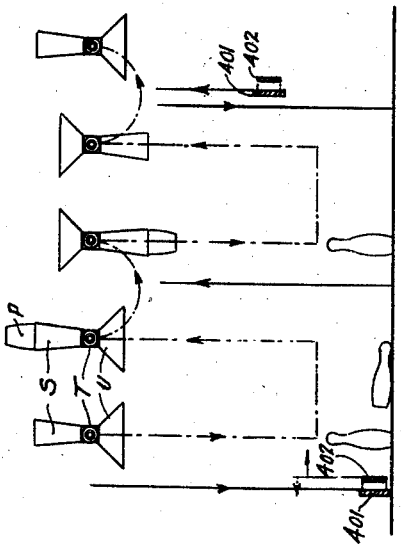
INVENTOR
RUPERT E. RUNDELL
BY
ATTORNEY Patented Aug. 21, 1945

2,383,017

UNITED STATES PATENT OFFICE 2,383,017

BOWLING PIN SETTING MACHINE CONTROL MECHANISM

Rupert E. Rundell, Rockville Centre, N. Y., assignor to American Machine and Foundry Company, a corporation of New Jersey Application June 28, 1941, Serial No. 400,164

39 Claims. (Cl. 273—43)

This invention relates to bowling pin setting machines and more particularly to improvements in completely automatic bowling pin setting machines wherein means are provided for setting pins in proper arrangement on the bed of a bowling alley, removing "deadwood" after the throwing of a ball, and respotting pins which remain standing after the removal of "deadwood" so that the play of the game can be continued in rapid order.

This invention also relates to automatic bowling pin setting machines and more particularly to improvements in control devices suitable for operating such machines in order to automatically effect various changes in its operation depending upon the several possibilities with respect to the number of pins knocked down by one or more balls. That is, if a strike is made the machine automatically registers the effect and more pins are fed from a magazine to the alley. So also, if a spare is made, other control mechanisms are automatically put into operation which will register the effect and cause the machine to go through a different set of operations than when a strike is made. Also if less than ten pins are knocked down by one or more balls, the machine will follow through certain cyclic operations which are different from those arising when a strike or spare is made.

It is, therefore, an object of my invention to provide improved mechanism for automatically changing the sequence of operations of my machine whenever a strike or spare is made or less than ten pins are knocked down by the number of balls allotted to a player for each frame of the game.

It is a further object of my invention to provide automatic mechanism which will throw one set of control devices into operation when a strike is made and another into operation when a spare is made and differentiate between the two.

It is a further object of my invention to provide an automatic bowling pin setting machine in which a plurality of pins, usually ten, is transferred from a magazine into a pin setting device and placed upon the bed of an alley in proper playing arrangement, and wherein after the throwing of a ball, mechanism is set into operation by the pin setting means for determining the effect of a thrown ball with respect to standing pins.

It is a further object of my invention to provide an automatic pin setting machine wherein a vertically moving pin setting device is provided with means which assist in determining the number of pins felled by each ball thrown and wherein control mechanism is advanced for changing the sequence of operations of the machine depending upon the number of pins knocked down by the first or second ball.

My invention also contemplates the provision of improved control mechanism associated with suction bowling pin handling means in which the suction handling means cooperate to furnish a new set of pins to the bed of a bowling alley whenever the control mechanism indicates that more pins are needed to continue the play of the game.

It is a further object of my invention to provide a pin setting device provided with pin handling members, each of which has associated therewith means for determining whether or not pins are standing after the throwing of the first ball of a frame so that when the device is moved towards an alley after a first ball is thrown and all pins are knocked down, selective means will be operated to initiate the feed of another set of pins to the alley.

It is a further object of my invention to provide an automatic pin setting machine wherein a vertically moving pin setting device is provided with means which assist in determining the number of pins felled by each ball thrown and wherein control mechanism is rendered operative to change the sequence of operations of the machine depending upon the number of pins knocked down by the first or second ball, and furnish mechanism for apprising a bowler of the result of each ball thrown.

A further object of my invention consists of the provision of mechanism for testing for the presence or absence of pins standing on a bowling alley bed after the throwing of each ball and control devices operating in response to the result determined by the testing mechanism for controlling the operation of the machine and causing it to set a new set of pins or reset standing pins after the throwing of a ball. My invention further includes mechanism for visibly apprising the bowler of the effect of each ball thrown.

With these and other objects not specifically mentioned in view, the invention consists in certain combinations and constructions which will be hereinafter fully described, and then set forth in the claims hereunto appended.

In the accompanying drawings which form a part of this specification, and wherein the several reference characters designate the same or like elements:

Figure 1 is a sectional side elevation partly diagrammatic, showing a preferred embodiment of various mechanisms for automatically operating and controlling a bowling pin setting machine;

Figure 2 is a front elevation showing a part of the mechanism of Figure 1;

Figure 3 is a partial side elevational view of the control mechanism and the pin handling table;

Figure 4 is a side elevation partly in section, taken on line 4—4 of Figure 5 showing a preferred form of control mechanism, the frame being omitted for sake of clearness;

Figure 5 is an end elevation of Figure 4;

Figure 6 is a plan view of Figure 4;

Figure 7 is a sectional plan view on line 7—7 of Figure 4 showing the suction valve control mechanism;

Figure 8 is a side sectional elevation of the mechanism of Figure 9 showing in section taken along line 8—8 construction of the index locking mechanism and its connection to the pin setter table;

Figure 8a is a sectional view of a detail taken on line 8a—8a of Figure 8;

Figure 9 is a plan view of Figure 8;

Figure 14 is a plan view of the pin setter table showing suction connections to the spotter and re-spotter funnels;

Figure 15 is a sectional elevation on line 15—15 of Figure 14;

Figure 16 is a sectional elevation on line 16—16 of Figure 14;

Figure 17 is a sectional view showing the suction inlet to the pin setter table;

Figure 18 is a sectional view on line 18—18 of Figure 17;

Figure 19 is a sectional view on line 19—19 of Figure 17;

Figure 20 is a sectional view showing a respotter unit resting on the bottom shelf of the table, the suction turned on bringing the valve stem down to hold the re-spotter secure while the table is rotated 180°;

Figure 21 is a sectional view showing the same respotter when raised by the pin and sealed against the top plate of the table and the valve piston forced up so as to lead suction into the valve to hold the pin and funnel secure to the table;

Figure 22 is a partial sectional view showing the suction valve in a neutral position;

Figure 23 is a top view of the switches shown in Figure 21 with the cover removed;

Figure 24 is a sectional view on line 24—24 of Figure 20;

Figure 25 is a development of suction cams for the respotter units;

Figure 26 is a development of the suction control cams for the pin handling units on the table;

Figure 27 is a development of cams for indexing the pin setter table;

Figure 28 is a development of cams for strike control circuit breaker and spare control mechanism;

Figure 29 is a plan view of the spotter and respotter cams;

Figure 30 is a side elevation of Figure 29;

Figure 31 is a plan view of the cams for indexing the pin setter table;

Figure 32 is a sectional elevation on line 32—32 of Figure 31;

Figure 33 is a side elevation of Figure 31;

Figure 34 is a diagram showing circuits from the respotter switches on the pin setter table;

Figure 35 is a front elevation of Figure 34 with part of the wires omitted for clarity;

Figure 36 is a sectional elevation on line 36—36 of Figure 34;

Figure 37 is a fragment of Figure 36 drawn to a larger scale;

Figure 38 is a plan view of Figure 37;

Figure 40 is a diagram showing the progressive operations after the first ball has knocked down all ten pins, resulting in a strike;

Figure 41 is a diagram showing the progressive operations after the first ball has failed to knock down all ten pins, not a strike;

Figure 42 is a diagram showing the progressive operations after the second ball has knocked down all the pins left standing by the first ball, resulting in a spare; and Figure 43 is a diagram showing the progressive operations after the second ball has failed to knock down all the pins left standing by the first ball, not a spare.

Figure 12:
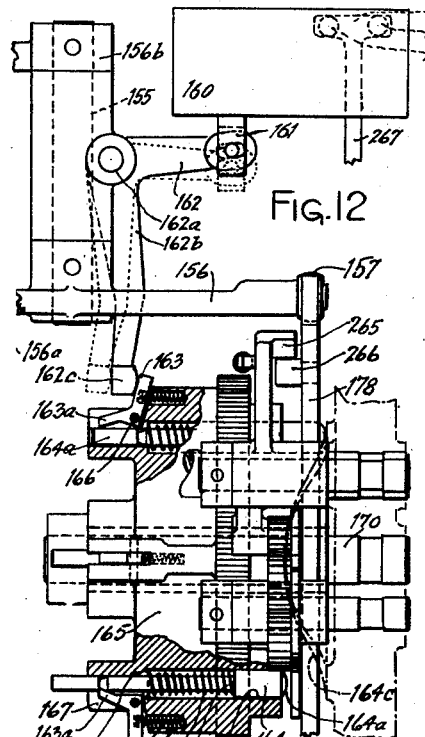
Figure 12 is an enlarged view, partly in section, of parts shown in Figure 10.

Referring to the drawings, in Figures 1, 2 and 3, I have shown a preferred form of my invention relating to an automatic pin setting machine wherein are provided side frame uprights 1a, 1b, 2a and 2b connected by cross frame members 3 and 4 and longitudinal members 28. Supported on cross frame 4 is a bracket 5 in which one end of a shaft 6 is journalled; the other end is mounted in a bearing in side frame 1b (Figures 1 and 2), and carried by the shaft is a cam 7. Shaft 6 is rotated by means of shaft 49 through sprocket 9 fastened to shaft 49 by means of a sprocket chain 10 tracking sprocket 11 journalled on shaft 12. Through sprocket 13, which is attached to sprocket 11 and also journalled on shaft 12, the drive is transferred by sprocket chain 14 to sprocket 15 mounted upon shaft 6 to rotate cam 7. Bowling pins, which are to be set upon the alley bed, are transferred from a magazine M by means of mechanism which may take the form of that shown in my copending application, Serial No. 260,901, filed March 10, 1939. The pins placed in predetermined arrangement in the table T, which is raised, lowered and inverted relative to the alley bed. In order to accomplish the desired movement of the table T, a gear segment 16, loosely mounted on shaft 12 and oscillated by means of a cam follower 17 mounted on the segment and engaging cam 7 causes the segment to rotate pinion 18 fixed to shaft 19 supported in arm 20 of bracket 5. Also fixed to shaft 19 is a sprocket 21 about which is trained sprocket chain 22 tracking a sprocket 23 fixed to shaft 24 mounted in brackets 25 supported by the side frames 2a and 2b of the machine.

In this manner the table T is raised and lowered at the proper times to set and reset pins thereon, that is, when a new set of pins is to be placed upon the alley, the table is lowered from pin receiving position to pin delivering position upon the alley bed, and then raised above the bed. After throwing a ball the table is lowered adjacent the bed to test for the presence or absence of pins. If all pins are knocked down, the table is raised to receive a new set of pins, as mentioned before, but if pins remain standing after the throwing of the first ball the standing pins are lifted, the alley is swept and the pins reset in a manner described hereinafter. After throwing the second ball, by means described hereinafter, the table is lowered and the presence or absence of standing pins determined, but if pins are standing they are not lifted but are swept from the alley into the pit.

Mounted on shaft 24 is a pulley 26 about which is trained cable 27 suitably connected at 28 to slide member 37, vertically slidable in guides 8 on side frame member 2a and provided at its lower end with a bracket 38 and a clamp nut 38a which secures hollow shaft 39 of table T in the slide bracket 38 for vertical movement. The further construction and operation of table T will be described hereinafter. Also assisting in the vertical movement of the table T is a cable 29 which is trained over pulley 30 supported by shaft 31 journalled in bracket 32 mounted on cross frame 3. Cable 29 extends over a similar pulley 35 mounted on shaft 33 supported by bracket 34 mounted on frame member 4. A counterweight 36 acts to balance the table. While I have only described the mountings of single cables, it will be apparent from Figure 2 that these cables may be provided on both sides of the machine.

As shown in Figures 1, 2, 3 and 14 to 16, inclusive, the table T comprises a plurality of pin setter elements S mounted on one side and a plurality of respotting units U mounted on the other side. The arrangement of the setters S and respotting units U conforms to the usual playing positions of pins on the alley bed, but may be varied in any other manner if desired.

Pins P, which are to be transferred and set upon the bed of a bowling alley, are fed from the pit of the alley by suitable mechanism (not shown), which may include spiral members 40 forming a part of a magazine indicated generally M wherein a plurality of pins, usually ten or more, is arranged in alignment for the removal therefrom of the desired number at a predetermined time by means of grippers 41 which are mounted upon a vertically and horizontally movable conveyor device designated 42 which consists of a plurality of longitudinal bars 43 secured to transverse supports 44. On bars 43 are slidably mounted carriages 45 which in the preferred embodiment are provided with independent gripping fingers 41 which engage and grip the required number of up-ended pins in magazine M for transfer to pin setters S (Figure 1).

The raising and lowering of the table T and operation of the pin transfer mechanism 42 is accomplished by means of a motor 47 mounted upon frame 1a, 1b of the machine at 48. A stud shaft 49 is driven by means of the sprocket 50 from the motor shaft 51 through a sprocket 52 mounted thereon and a chain 52a. The drive is transferred from shaft 49 to shaft 6 by means of sprocket chain 10 in the manner described hereinafter. In like manner, shaft 53 on which is mounted cam 54 which causes the raising and lowering of pin transfer 42, is driven by means of sprocket 55 mounted on shaft 49 through sprocket chain 56 tracking a sprocket 57 on shaft 53. Cam 54 is provided with a high and a low portion, and whenever the low portion is engaged by cam follower 58 on lever 59, the transfer 42 will be either in pin receiving position over the magazine M or in pin delivering position over setters S. Lever 59 is provided with an arm 60 to which is attached a link 61 connected at 62 to lever 63 provided with an arm 64 pivotally connected to bar 44 forming a cross member of the frame of transfer 42.

The carriages 45 are moved longitudinally along bars 43 by means of pinions (not shown) mounted on shaft 69 journalled in arm 68 which also forms a part of lever 59 mounted on shaft 69. On shaft 69 is provided a sprocket 70 over which tracks a sprocket chain 71 engaging the sprocket 72 on shaft 67 by means of a pinion (not shown) on shaft 69 engaging a suitable driving means, such as a gear segment (not shown) of the type described and disclosed in the above referred to copending application. In this manner the bowling pins are lifted from spirals 40 by grippers 41, moved clear thereof, transferred longitudinally and located in proper arrangement in pin setters S where they are held while the carriages 45 with the grippers 41 move back to obtain a new set of pins.

After the carriages 45 have delivered the pins from the magazine to the setters S, the pins, gripped firmly therein by suitable means such as mechanical grippers or holders operated by suction, provided in the table from a suitable source of supply through a conduit 73 and valves $V_1$ and $V_2$, hereinafter described more in detail, are transferred to the alley A. Conduit 74 connects valve $V_1$ (Figures 4, 5 and 6) through a flexible conduit 76 to a hollow plug 78 fixed in hollow shaft 39 (Figure 17), so that suction created in conduits 74, 76 can be transmitted through a two-way element 80, which supports one end of a hollow shaft 81, through two-way elements 82 fastened to the other end of member 81 and provided with an opening connecting a hollow plug 84 with a flexible conduit 85. Conduit 85 conducts suction to ducts 87 which are connected to each of the pin setter units S. Since plug 84 is adapted to rotate relative to fixed hollow shaft 39, a circumferential suction passage 83 is formed in element 82, shaft 39 and sleeves 83a which surround shaft 39. In this manner it is possible to create the desired fluid pressure, and maintain it regardless of the rotation of table T.

In order to operate the resetting or respotting members U, there is provided a flexible conduit 77 which connects with conduit 75. Flexible conduit 77 connects to a hollow plug member 79 fast in shaft 39, and suction is inducted into the hollow shaft therefrom through a circumferential passage 88 similar to 83 into the bore of plug 89 about which is seated flexible conduit 90 which through ducts 91 supplies the several respotting units U with fluid pressure whenever pins are to be lifted and respotted.

Table or elevator T may consist of a frame F provided with a central barrel or hub 92 mounted upon sleeves 83a for rotation about and relative to stationary shaft 39. Barrel 92 is held in proper position upon shaft 39 against lateral movement thereon by means of a collar 93 positioned about shaft 39 and locked in adjusted relationship thereto by means of a set screw 94. Referring to Figures 14, 15, 16 and 18, it will be seen that frame F supports the several setters S in usual substantially triangular pin formation, although any other desired arrangement may be used. Setters S are rigidly mounted upon pipes 87 which are clamped to the frame F by means of clamps 95 fastened to frame F.

Pin setters S corresponding to bowling pins, numbers 1, (I), 5, (V), 7, (VII), and 10, (X), in the form shown, are provided with elbows 87a connecting them to the system of pipes 87, while the remaining setters are mounted upon the pipes 87 by means of T units 87b. Attention is called to Figures 15 and 16, which illustrate this method of mounting the setters S. Inasmuch as suction is inducted into the system 87, by means of conduit 85, it will be uniformly distributed through the several pin setters as desired. The table T also comprises an upper plate 96 and a lower plate 97 provided with a number of openings 101 therein corresponding to the number of pin respotting units. These two plates are connected by means of spacers 98 which by means of suitable nuts 99 hold them rigidly separated one from another. Upper plate 96 is secured to frame F by means of brace 100 extending downwardly from the frame F. Slidably mounted upon lower plate 97 and substantially concentric with each of the openings 101 therein, are the bowling pin respotting units U, which are substantially the same as those shown and described in the above referred to application. In order to prevent excessive lateral movement of the respotters U on their support, circular depending flanges 102 are mounted on the under surface of plate 96. Due to the shiftable or "floating" mounting of the respotters U on table T, it is always possible to register the presence of a pin whether it be on or off spot. The electrical connections necessary for this purpose are described hereinafter. In order to control the operation of the bowling pin setters, insofar as the application of suction is concerned, when it is desired to lift pins from the alley for respotting, brackets 103 are employed, which support suction conduits 104 to which suction is conducted by means of pipe 91 described previously.

In order to control the suction in the pin setters S and respotting units U, there has been provided a housing 105 which has lugs 106 through which project screws 107 fastening the housing to machine frame 2a (see Figures 3 to 7, inclusive). Also secured to frame 2a by means of screws 109 is a bracket 110 having a bearing 111 in which is journalled a shaft 112. Secured to one end of shaft 112 is a crank arm 113 while at the other end is fixed a lever 114 provided with a cam follower 115. Crank 113 is connected to a link 116.

Also forming a part of housing 105 is an arm 105a provided with a journal 105b (Figure 6). A shaft 117 is journalled in journal 108a of projection 108 formed on housing 105 and in the journal 105b. Mounted on shaft 117 is a sprocket 118 which through sprocket chain 119 drives the shaft in the direction indicated in Figure 4. Levers 121 and 121a are journalled on shaft 122 mounted in housing 105 and bracket 123 secured to housing 105 by screws 124. Shaft 122 is fixed in housing 105 by a set screw 126. Levers 121 and 121a are provided with portions 127 arranged to engage with adjustably mounted set screws 128 mounted in housing 105 and thereby control the downward movement of the levers.

The suction control mechanism may consist of a double valve device, designated generally D (Figures 1, 4, 5 and 6) having a bracket portion 129 mounted upon housing 105 by means of screws 130. Two valves V1 and V2 are provided, for reasons described hereinafter, and since the construction is identical it will suffice to describe one in detail. Valves V1 and V2 are arranged side by side and in the illustrated embodiment are formed in a single unit. Slidably mounted in each of the valves is a piston member 131, having a slotted lower end and a pin 132 resting on the end of lever 121. Piston member 131 is provided with a reduced portion 133 approximately midway of its length, and at its free end has a substantially L-shaped bore 134. The piston is slidably movable in bore 135 formed in each valve device. A spring 136 bears against and tends to urge each piston 131 into suction cut off position in which the reduced portion 133 lies out of alignment with bore 139 so that L-shaped bore 134 bleeds through opening 138, and pipe 74, and the tail 127 of lever 121 rests against set screw 128 thus preventing excess downward movement of lever 121. In this position (see Figure 4) all suction through conduit 74 is cut off.

Cam follower 120 on lever 121 is provided for tracking one or more cams which are moved into cooperating position therewith as described hereinafter. In this manner lever 121 is raised against the compression of spring 136, reduced piston portion 133 is aligned with bore 139 and pipe 74, suction flows from conduit 73 to pipe 74, and thereby enters either the pin setter or the pin respotting system, and either one of the other, respectively, is made active for gripping and handling pins, as pointed out above. As stated, valves V1 and V2 are identical in construction and operation although they are operated in different timed relation, as will be made evident hereinafter. A single source of suction 73 feeds both valves. A bore 131a connects valve V1 and a similar bore 131b connects valve V2 with the source of suction.

The operation of valves V1 and V2 is controlled by a series of cams slidably mounted on and rotating with shaft 117. As shown in Figures 4, 5, 6 and 7, cams 141, 142 and 143 coact with cam follower projection 120 on valve lever 121, and cams 144, 145 and 146 cooperate with projection 120a on valve lever 121a to open and close these valves. The cams may all be formed as an integral unit or connected together (as shown, secured to a disk 174, and mounted for sliding movement as a unit on shaft 117). Fixed to cam 144 is a hub 148 having a reduced portion 149 engaged by cam follower 115 carried by lever 114 so that whenever this lever is rocked, the cams will be shifted along shaft 117.

Mounted on frame 2 are other elements of the control mechanism in which the several stationary shafts thereof are fixed in spaced frame members 150 and 151 secured to the frame 2 and to each other at 153 (Figure 9).

Figure 13:
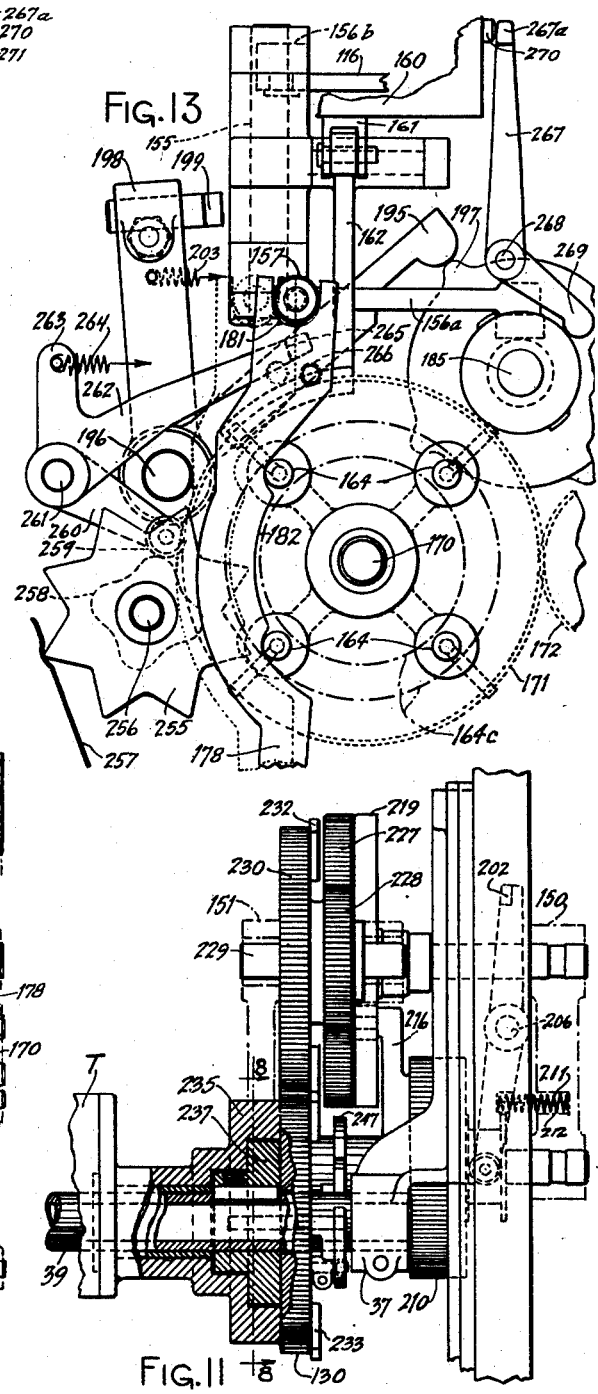
Figure 13 is a side elevation of Figure 12.
Figures 10, 11:
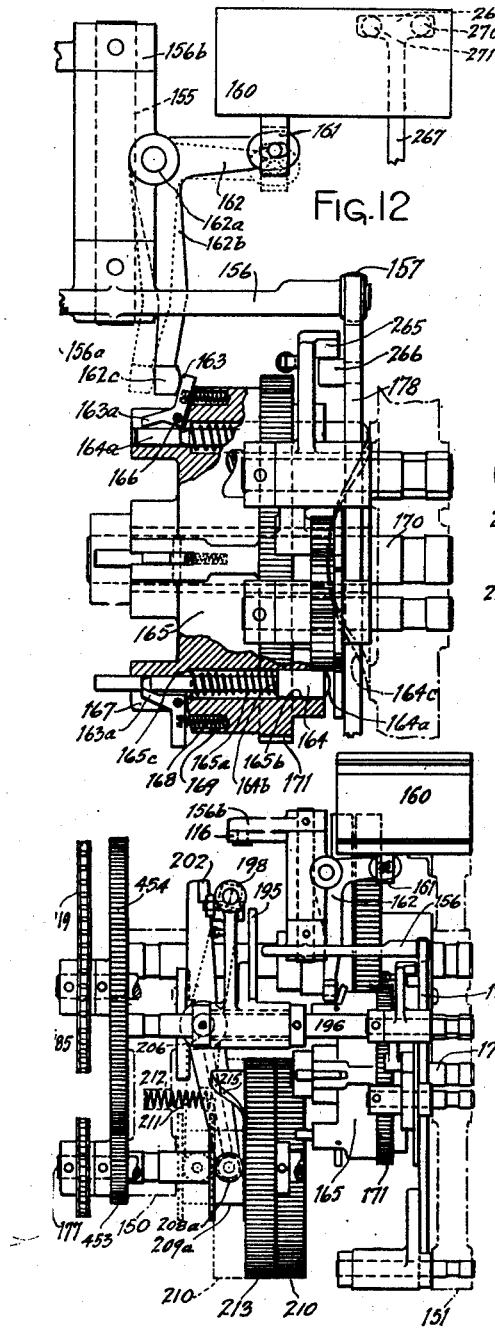
Figure 10 is a rear view of the control mechanism shown in Figure 8.
Figure 11 is a front view of the indexing mechanism, partly in section showing the connections between the pin setter table and the indexing device.

The mechanism for indexing the pin setter table will now be described. Referring to Figure 12, it will be seen that a solenoid 160 mounted on frame 151 (Figure 10) is provided with an armature 161 connected to a bell crank lever 162 pivotally mounted at 162a in a bracket 162b in which is also mounted shaft 155 to which lever 156 is attached. Lever 156 is provided with an arm 156a, and to the upper end of shaft 155 is attached an arm 156b. Arm 156b is pivotally connected to link 116 (Figure 6). The free end of lever 162 is provided with a trigger or hammer portion 162c movable by operation of solenoid 160 into engagement with latches 163 mounted about a turret 165. These latches cooperate in holding the pins 164 in inoperative position. From a reference to Figures 12 and 13, it will be seen that solenoid 160 has been energized whereupon armature 161 has moved lever 162 from its normally inoperative position, as shown in dotted lines in Figure 12, to its latch engaging, or full line position, where impact arm or hammer 162c has engaged a latch 163; hence under such conditions the latch is tripped, and the pin 164 under its control is released. Turret 165 carries a plurality of pins 164 spaced ninety degrees apart, as shown in Figure 13. Each of the pins is slidably mounted and normally spring urged into operative position. Each pin is also provided with a reduced portion 164a adapted to be engaged by tail 163a of latch 163 for locking the pin in inoperative position. As shown in detail in Figure 12, each pin 164 is slidably mounted in bores 165b formed in the turret 165, and encircling each pin is a spring 165a, one end of which engages a shoulder 164b of pin head 164a while the other end of the spring bears against a shoulder 165c of the bore 165b.

The several latches are pivotally mounted at 166 in grooves or slots 167 formed in the turret. Springs 168 located in bores 169 formed in the turret 165 urge latches 163 into latching position as the pin 164 is pushed in when the pin head 164a rides on cam 164c.

Turret 165, which is responsible for the operation of the strike control mechanism of the machine, is loosely mounted on shaft 170, and has either formed integrally therewith or suitably attached thereto a gear 171 which is driven by gear 172 mounted on shaft 173, meshes with gear 174 on shaft 175, and gear 174a, also on shaft 175, which are driven by gear 176 on shaft 177. Shaft 177 is driven from sprocket 450 on the main drive shaft 49 through chain 451 to sprocket 452 on shaft 177. Pinion 453 on shaft 177 meshes with gears 454 on shaft 185 on which are mounted the several cams (186 to 191, inclusive) which control the various operations as will be hereinafter described.

Referring to Figure 13, which shows the angular arrangement of the four pins 164 used in the illustrated form of my invention, it will be seen that in its counter-clockwise movement, each pin, if and when it is released from latch 163, becomes operative approximately forty-five degrees from the vertical, at which time it engages cam surface 182 of a lever 178, hereinafter described more in detail. It is also to be noted that as the turret is rotated step by step through 90° each cycle of the machine during which time shafts 6 and 53 make the desired number of revolutions, each of the pins 164 will be moved past hammer or trigger head 162c and if the pin is not released by the striking impact of the hammer with its locking latch 163 because the hammer 162c is not operated to unlatch it, the pin cannot project from the turret, as shown in Figure 12, and hence cannot engage cam portion 182, as above mentioned, and operate the strike control mechanism.

Whenever turret 165 conveys any of the pins 164 past trigger 162c, and a particular pin is released from a particular latch, that pin will operate in the manner above described. That is, when a pin 164 is unlatched, spring 165a, which abuts against shoulder 164b, forces the pin to the right (Figure 12) and the strike control mechanism will be rendered operative.

Lever 178 is pivotally mounted on shaft 179 fixed in frame 151. A collar 180 pinned to shaft 179 limits the lever against lateral movement. Lever 178 in addition to the cam 182, substantially midway of its length, is also provided with a yoke 181 at its free end in which rides a roller 157 carried on the end of lever 156. In this manner whenever lever 178 is rocked about its pivot because of its engagement with a pin 164, link 116 rocks lever 113, which shifts collar 148 and its associated cams along shaft 117. Arm 156a of lever 156 is provided with a cam follower 158 which rides in a groove 183 formed in member 184 slidably mounted on shaft 185. Attached to or formed integrally with member 184 are cams 186, 187 and 188 on one side of groove 183, while cams 189, 190 and 191, the last of which is a blank, are located on the other side. Spring 194, which encircles shaft 185, bears against collar 192 fixed to shaft 185 and urges member 184 against collar 193 also pinned to shaft 185.

When the lever 178 is moved by a selected pin 164, it causes yoke 181 to rock arm 156 which controls the movement of the strike and spare cams. Hence, if there is a full stroke of lever 156 (from full-line to dotted-line position, Figures 6 and 13), the movement of member 184 along the shaft 185 will position cam 188 in the path of a lever 195 mounted on shaft 196 for engagement by the bumps 197 of cam 188 for indexing the pin setter table T through one-half of a revolution.

When a bump 197 engages with lever 195 it swings a lever 198, fast on shaft 196, provided with a locking nose 199 out of locking engagement with lever 202. A spring 203, one end of which is secured at 204 to the lever 198 and the other end of which is suitably connected to the frame, normally urges lever 198 into locking engagement with lever 202.

Lever 202 is mounted on one end of a shaft 206, which is journalled in brackets 206a and 206b suitably secured to frame 150 of the indexing mechanism. At the other end of shaft 206 is mounted a lever 207, provided with cam followers 208 and 208a. Cam follower 208 runs in a groove 209a in member 209 formed integrally with or suitably attached to gear 210 which is slidably and rotatably mounted on a fixed shaft 214. A spring 211 located in a recess 212 in frame 150 bears against lever 207 so that whenever lever 202 is released from locking engagement with lever 198, the spring 211 forces gear 210, which meshes with gear 213 fixed to shaft 177, to slide along shaft 214, each of which shafts makes two revolutions per cycle of the machine.

Fastened to or formed integrally with gear 210 is an arm 216 provided with a cam follower 217 arranged to engage slots 218 in a Geneva gear 219 rotatably mounted on shaft 220 whenever lever 207 is rocked by shaft 206 to slide arm 216 into engagement with Geneva gear 219 whereupon cam follower 217 carried by arm 216 is positioned to engage one of the slots 218 in Geneva gear 219. As shown, slots 218 are spaced 90° apart so that every time the cam follower 217 engages in a slot 218, the Geneva gear will be indexed through 90°. Spaced 90° apart about the periphery of Geneva gear 219 and between slots 218 are apertures 221 into which fits a projection 222 mounted on a lever 223 pivoted at 224 and provided with a cam follower 225 tracking a cam 226 mounted on the hub of arm 216. In this manner, after each indexing movement of arm 216, projection 222 will be brought into engagement with an aperture 221 to lock the Geneva gear 219 against overrun.

Attached to or formed integrally with Geneva gear 219 is a gear 227, which meshes with and drives gear 228 mounted on shaft 229 journalled in side frames 150 and 151. The gear ratio between gears 227 and 228 is one to two (1:2), so that for every 90° of movement of gear 227, gear 228 is rotated through 180° thereby turning table T through 180°. At the conclusion of the indexing operation, a cam 215 mounted on the face of gear 213 engages cam follower 208a on lever 207 thereby disconnecting cam follower 217 from Geneva slot 218, whereupon cam follower 225 riding on cam 226 locks shaft 220 against further rotation because of the engagement of projection 222 with aperture 221 (see Figures 4 and 8). Also mounted on shaft 220 and either formed integrally with or attached to gear 228 is a gear 230. Fixed at 180° intervals adjacent the periphery of gear 230 and on the face thereof are plates 231 provided with projections 232. These projections are positioned to engage with cut-out portions or apertures 233 formed in plates 234 fixed to the face of a gear 130 mounted on hub 235 of table T.

From the above it follows that setter table T, which is mounted on shaft 39 supported by slide brackets 37 running in slides 8, will be in position to be turned on shaft 39 through 180° whenever one of the projections 232 carried by a gear 230 is in engagement with an aperture 233 carried by gear 130 (Figure 4).

Setter table T is provided at one end (see Figures 2, 9 and 14) with a hub 235 so that whenever gear 130 is rotated through 180°, setter table T also will rotate a similar amount. In order to lock the table against possible rotation until such motion is desired, there has been provided a latch and thrust collar 237 between hub 235 and one face of gear 130; this collar is keyed to shaft 39 and is provided with openings 238 in which fit noses 239 formed on latches 240 which are pivotally mounted on short shafts 241 carried by gear 130 and hub 235. In the present embodiment two latches spaced 180° apart are employed, thereby making it certain that the table will be unlocked for indexing at the proper time. Each latch is furnished with a control arm 242 and springs 243 cooperate with tails 244 formed on the latches to maintain noses 239 in locking engagement with openings 238. An adjustable link 245 connects lever 246 attached to shafts 241 so that whenever one latch 240 is moved out of engagement with collar 237, the other also will be moved. Mounted on the hub of arm 216, adjacent cam 226, is a cam 247 positioned to engage the control arms 242 of latches 240 so that whenever lever 216 moves to drive Geneva gear 219, the high portion of cam 247 engages one of the arms 242 of latches 240 and thereby unlocks gear 130 and hub 235 from collar 237 so that setter table T can be indexed the desired amount, in this case, 180°. It will be observed that gear 130 is so mounted that the setter table can be raised and lowered and also inverted in proper timed relation to the control mechanism. This arrangement also makes it possible to index the table in one direction.

Loosely mounted on shaft 256 is a star wheel 255 provided with a plurality of projections 255a positioned in the path of pins 164 on turret 165 so that during the rotation of the turret, whenever a pin 164 projects therefrom, the pin in addition to engaging cam surface 182 of lever 178 will also engage one of the projections 255a and turn star wheel 255 through one step, the magnitude of which depends upon the number of projections 255. In the present embodiment there are eight projections 255a and the star wheel is indexed 45°. A flat spring 257 bears against the periphery of star wheel 255 and prevents excess movement thereof under the influence of pins 164.

Fixed to wheel 255 is a cam 258 provided with alternate high and low portions, and so arranged that whenever star wheel 255 is indexed, cam 258 will also move through a given angle. Tracking on cam 258 is a cam follower 259 mounted on lever 260 pivoted on shaft 261. Lever 260 is also provided with arms 262 and 263, and to arm 263 is fastened one end of spring 264, the other end of which is suitably secured to a stationary part of the machine. Spring 264 maintains cam follower 259 in tracking engagement with cam 258. On the free end of arm 262 there is provided a projection 265 arranged to be moved into and out of the path of a pin 266 mounted on and projecting laterally from lever 178. The arrangement of this mechanism is such that whenever lever 178 is moving on its return stroke after having been moved outwardly by a pin 164, if cam follower 259 is running on a high part of cam 258, projection 265 will move clear of pin 266, but if cam follower 259 is positioned on a low part of cam 258 then projection 265 will be moved into the path of pin 266 and hence will lock lever 178 against full return movement.

As shown in Figures 6 and 13, movement of lever 178 is responsible for the movement and positioning of shiftable member 184, which has associated therewith a series of cams 186 to 191, inclusive. Movement of lever 178 also shifts disk 147 and the several cams 141 to 146, inclusive, which are associated therewith. Therefore, whenever a pin 164 moves lever 178 through a full stroke, cam 188 will be positioned to engage lever 195, which at the proper time sets into operation the indexing mechanism for the table T. So also, when lever 178 returns the full distance to its starting point, cam 186 will be located for engagement with lever 195 for a similar purpose. If, however, lever 178 is locked intermediate these positions because of the engagement of projections 265 with pin 266, then the table T will be indexed because of the operation of middle cam 187 which is then positioned for coaction with lever 195.

Figure 27 shows cams 186, 187 and 188 expanded. It will be noted that cam 188 is provided with four bumps, equidistantly spaced, or 90° apart, and that bumps $188^1$ and $188^2$ operate as one active set, while bumps $188^3$ and $188^4$ perform likewise as another set. Cam 188 is the strike control cam. Cams 186 and 187 are spare control cams. Each cam is rotated through one-half a revolution per cycle of the machine. The cams are so arranged that whenever a new set of pins has been set upon the alley, either cam 186 or 187 will be positioned with lever 195 coacting therewith after the throwing of the first ball. This is because in some instances lever 178 can move back to its original or inoperative position, in which case, cam 186 is positioned to engage lever 195, or in the event that cam follower 259 rests on a low portion of cam 258, lever 178 will be locked in its intermediate position and cam 187 will be located to engage with lever 195.

Assuming that the first ball has been thrown, the machine set into operation, and all the pins have been knocked down and that a strike results, pin 164 will be released to engage lever 178 for purposes described above, so that cam 188 will be shifted into position to coact with lever 195 for indexing the table and setting a new frame of pins on the alley. If two balls must be thrown and a spare results, either cam 186 or 187 will be engaged with lever 195. If, for instance, lever 195 is tracking cam 186 and a strike is made, cam 188 will be moved into engagement with lever 195 so that bump 1 on cam 188 will effect the indexing of the machine to deposit a new set of pins on the alley, and that in the continued movement of the cam, bump 2 of the cam 188 will cause the table to index through 180° in the same direction to return the pin setter into position to receive a new set of pins when the appropriate time arrives. Due to the fact that lever 178 has been moved by the pin 164, made operative by unlatching of latch 163, star wheel 255 has also been indexed, which means that cam follower 259 has moved off the high part of cam 258 onto a low part thereof thereby locking lever 178 in its intermediate position so that cam 187 is shifted for engagement with lever 195. When a ball of the next frame is thrown, if a strike results, the pin 164 which is selected will shift cam 188 again into engagement with lever 195 and a high part of cam 258 will be moved for engagement with cam follower 259 which means that projection 256 will be moved clear of pin 266 thereby allowing lever 178 to move its full throw, in which event cam 186 will be set for engagement with lever 195. If after the throwing of the first ball of any frame, pins remain standing, lever 162 cannot be moved into position to engage and unlatch pin 164 because solenoid 160 is not energized, and hence lever 178 will remain stationary so that either cam 186 or 187, if it be the one engaging lever 195, will remain coacting with lever 195 until another strike is made, whereupon cam 188 will be shifted in the manner described above into the place formerly occupied by either the cam 186 or 187.

Acting in conjunction with the pin control or strike or spare cams, just described above, are a plurality of means which are responsible for the proper operation of the suction valves, and the setting and resetting units respectively.

Figures 4, 5, 6, 9 and 25, inclusive, show a preferred form of mechanism for controlling the operation of the suction valves for the pin handling devices. Since cams 189, 190 and 191 and connected to member 184, it is evident that whenever cams 186, 187 and 188 are shifted back and forth along shaft 185, these cams also will be moved in a similar manner. Located to coact with and track these last-named cams 189, 190 and 191, is a lever 267 fastened to shaft 268 and provided with a cam follower portion 269 which travels upon the periphery of these cams. Lever 267 is, therefore, rocked by one of these cams, as selected, in proper timed sequence and is so constructed that it can simultaneously press against buttons 270, 271 which are mounted adjacent solenoid 160 (Figures 8, 13 and 32).

Switch 270 operates the pin carrier system 42 to effect the feed of additional pins to the pin setters S, and switch 271 operates signal mechanism described further hereinafter. Lever 267 is provided with a projection 267a which engages both switches simultaneously. Because of this arrangement lever 267 can be operated by either cam 189 or 190 which forms a part of member 184 slidable on shaft 185. Each cam is provided with a single bump, tracked by lever 269, either formed integrally with lever 267 or as a separate lever fixed to shaft 268 so that as the selected cam is tracked by lever 269 the switches will be operated by lever 267 and the desired operating circuits energized in proper order.

It will be seen, therefore, that cams 189 and 190 are complementary in action to cams 186 and 187 and because the bumps of cams 189 and 190 are set to operate in advance of the high parts on cams 186 and 187, the pin carrier system will always feed pins to the pin setter S before the table P is indexed to deliver the pins carried by the setter upon the alley in proper playing arrangement.

Figure 39:
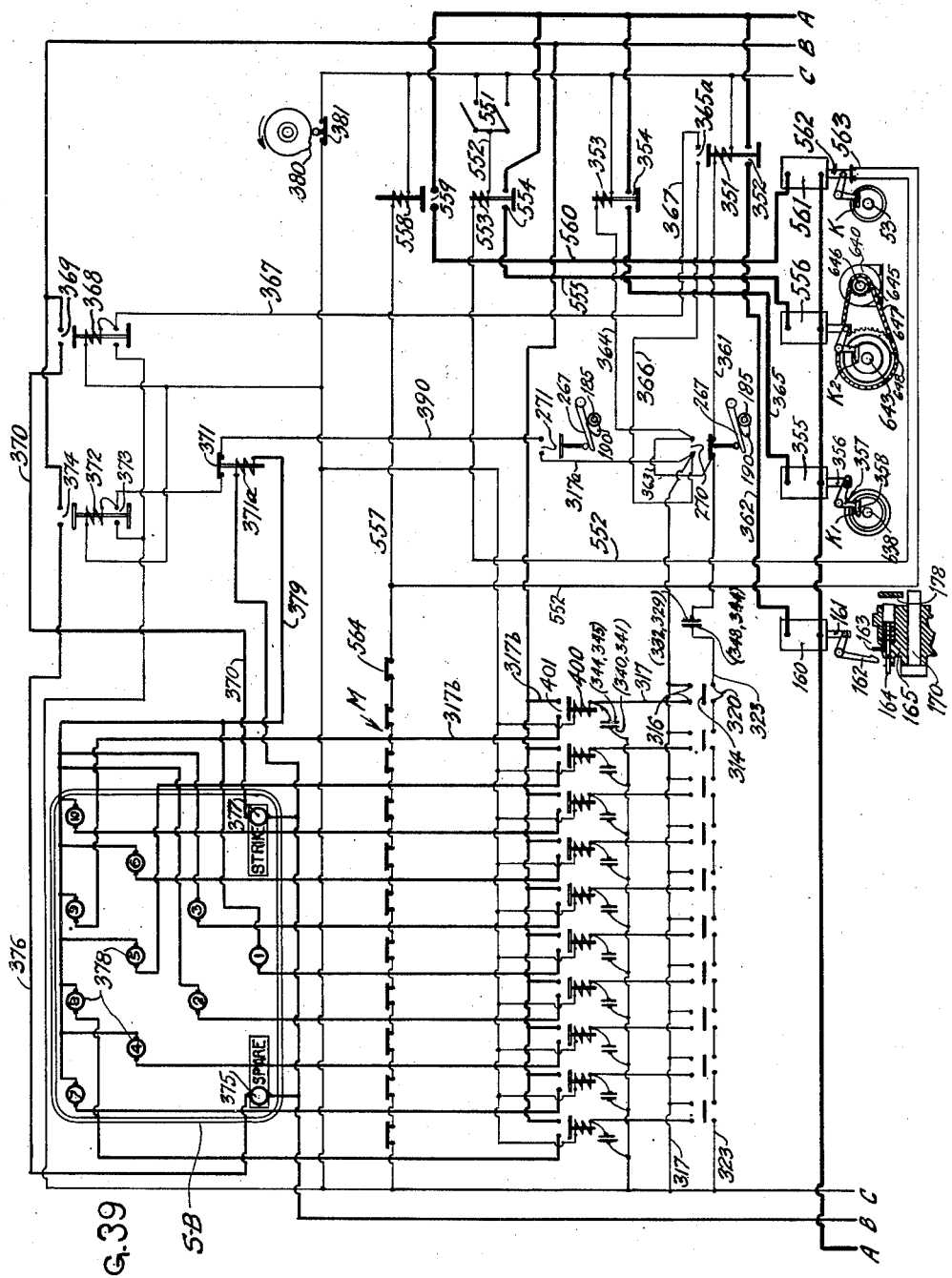
Figure 39 is a wiring diagram showing the wiring from the pin setter table to the control mechanism.

During the interval in which the pin carrier system feeds pins to the setter and the indexing of the table from pin receiving to pin discharging position, the alley has been swept clear of "deadwood" and the fallen pins and ball have been shunted to their distributing means for return to the pin magazine and bowler, respectively, by means (not shown) which may be the same as that described in the co-pending application referred to hereinabove. In a like manner, cams 189, 190 are complementary, but due to the fact that cam 191 is a blank there will be no movement of lever 267, and hence whenever a strike is made and cam 189 is operative, switches 270 and 271 will not be disturbed, so that line 323 is a closed circuit due to the fact that switch 270 is closed, as shown in Figure 39, thereby providing for the operation of solenoid 160 and the feed of a set of pins to setters S, as described hereinbefore.

It follows, therefore, that in the operation of my machine different sequences of operation take place dependent upon the number of pins knocked down by each ball thrown. Therefore, if all the pins are knocked down by the first ball, or a strike is made, certain mechanisms will be selected and will operate, and likewise the machine will function differently if all the pins are knocked down with two balls when a spare results. So also a different sequence of operations will follow if all of the pins are not knocked down by the number of balls allowed for each frame of the game. The machine will automatically differentiate, select, set and reset the desired number of pins so that the play of the game may continue automatically and uninterruptedly insofar as the proper and desired setting of pins is concerned.

Figures 20 to 24, inclusive, show the detail construction of the resetter units U which have been mentioned hereinabove. The resetter units are each provided with means for conducting suction, automatically registering the presence or absence of standing pins, and, therefore, are responsible for the movement of pins to the setters S. Since all of the pin resetter units are the same, only one will be described in detail. In the preferred form cooperating therewith, each resetter units has a tubular bracket 300 fixedly mounted upon plate 96 in centered relation with reference to an opening 96a therein, and in proper arrangement with respect to the required position of the pins as set and reset upon the alley, in usual triangular formation or other desired arrangement. A piston 301 is slidably mounted in the bore 301a of the bracket, and has associated therewith and fixed thereto a valve 302 provided with a bore 303 having a transverse suction distributing slot 304 in the free end thereof so that suction at all times may be distributed to the pin distributor unit. Suction is conducted from bore 303 through a bore 305 in each resetter unit which communicates with the space above the center of a pin. Coiled about the valve 302 is a spring 306 which bears against the piston and normally tends to urge it upward as shown in Figure 21. A suction opening 307 is formed in the bore in order to make it possible for suction to be fed from conduit 91 and hence through the bores 303 and 305 for gripping pins. In Figure 21 the suction opening 307 is shown aligned with conduit 91 so that suction is being conducted causing the respotter to grip a pin. Projecting from the upper face of piston 301 is a rod 308 about which is coiled a spring 309 bearing against the upper face of the piston and tending to push it downwardly against the pressure of spring 306. Rod 309 extends upwardly through opening 310 in insulating plug 311 which is secured in the open end of bracket 300. Mounted on rod 309 are insulating plugs 312 and 313 between which is located a conductor disk 314 held thereon by means of a screw 315. Disk 314 is adapted to engage spring contacts 316 mounted 180° apart on insulating plug 311 by means of bolts 318 secured to contacts 317a of wires 317 by means of nuts 319. As shown in Figures 22 and 23, placed substantially 90° apart from contacts 316 are spring contacts 320 which are fixed to insulating plugs 311 by means of bolts 321 and nuts 322 which also secure contacts 322a of line 323. It will be noted that in Figure 21, disk 314 is shown as closing a circuit through spring contacts 316, while in Figure 22 the disk is show in neutral or "circuit open" position. However, in Figure 20 the disk is shown closing a circuit through contacts 320 and wires 323. A light cover 300a is provided for protection against dust and injury to the switch unit.

In Figure 20 suction from the line 91 has pulled down piston 301 so that opening 307 is cut off from the source of suction and the pressure of valve 302 bearing against disk 324 is sufficient to hold the unit U against lower plate 97 so that it will not slide between support plates 96 and 97 during the indexing of the table T. From this it follows that as units U are moved down into engagement with the heads of standing pins, as indicated in dot-dash lines in Figure 21, these pins will be sealed to the table and lifted off the alley floor when the table rises. In Figure 21 a different operation takes place because suction opening 307 is aligned with conduit 91, the suction is conducted through bores 307 and 305 to grip a pin for lifting.

Referring to Figures 34 to 38, inclusive, it will be seen that mounted on frame F by means of bolts 325 are brackets 326 to which is fastened by means of bolts 327 a switch board 334. This board may be made of any suitable insulating material, such as Bakelite or the like, or any other suitable material commonly used for this purpose, and is formed in the general shape of a semi-circle with the several switches 329 mounted thereon by means of bolts and nuts 330 and 331 to which are fastened wires 323 connected in series to switches 320 mounted on plugs 311 of the resetter units, as described hereinabove.

As shown in Figures 37 and 38, switches 329 are preferably formed of flat spring material and are mounted for engagement with contacts 332 secured by nuts 233 to fixed plate 328 which is rigidly mounted by means of screws 335 on an arm of bracket 336. The switches 329 may also be arranged in concentric semi-circles and the contacts 332 are likewise arranged in a complementary semi-circular relationship so that, whenever plate 328 is moved relative to plate 334, switches 320 will make or break circuits through the wires 323. Wires 323 are connected to contacts 332 by means of nuts 333 (as shown in Figure 38). As shown in Figures 34 and 35, there are two contacts for each set of wires 323 so that there are two switches 329 and two contacts for each set of wires leading to each respective pin resetter unit. As described previously, each resetter unit is also provided with spring switch members 316 which are connected to wires 317 of the light system. These switches are connected in parallel through all the pin resetters and the sets of leads thereof are connected by means of nuts 333 in plate 334. Bracket 336 is clamped in such a manner by means of bolt 336a to shaft 39 that a plate 334 extends upwardly therefrom. Plate 328 is so mounted with respect to hub 92 of frame F that switches 329 and 340 engage with the contacts 332 and 341 on plate 334 whenever the pin resetters are located above the alley in position to determine the presence or absence of standing pins thereon. Consequently, when the table T is indexed and lowered towards the alley, circuits will be made through wires 323 and 317 because then switches 329 engage contacts 332 and switches 340 engage contacts 341. It will be seen, therefore, that as the table is moved upwardly and indexed another 180°, the several switches will be opened and the several circuits will be broken.

The leads 323 which are attached to plate 334 extend to plate 343 mounted on bracket 336. Plate 343 is made of non-conducting material having several contacts 344 which are engaged by spring switches 345 secured to plate 346 by means of bolts 347 and nuts 348. Leads 323 are similarly secured to plate 343. Plate 346 is mounted on a bracket 349 fixed to frame I. In this manner, despite the fact that carriages 37 mount the shaft 39 for vertical movement, nevertheless the electric circuits can be made and maintained whenever switch 345 contacts 344 in lowered position of the pin setter table T.

Referring to Figures 4, 5, 6, 7 and 13, it will be apparent that there is a direct relationship between the several cams which function to control the machine when a strike or spare is made, or if pins remain standing on the alley after the throwing of the allotted number of balls, and the suction control means which coact with the suction valves controlling the supply of suction to the pin setters and resetters of the pin handling table.

If it be assumed that a set of pins is standing on the bowling alley in playing arrangement at the beginning of a game, then under normal conditions cams 141 and 144 of the cam assembly 147 will be positioned to engage with levers 121 and 121a for opening and closing the suction valves $V_1$ and $V_2$.

Referring to Figures 25, 26, 27 and 28, which show diagrammatically the approximate shape of the several cams expanded, lever 121a engages cam 144 while lever 121 engages cam 141 and at the same time lever 195 tracks cam 186 and lever 267 runs on cam 189. When the first ball is thrown and pins remain standing, the table when lowered will bring the resetter units U into a position proximate the alley in order to test for standing pins, and since pins are found standing, the several levers and cams retain the relationship described above. Due to the continued rotation of the several cams when the respotters engage the standing pins, lever 121 rides on a high portion of cam 144 and suction goes on in order to grip the standing pins so that when the table is lifted, the standing pins will be picked up in order that "deadwood" may be removed from the alley by the sweep. The suction is maintained on until the table descends and respots the lifted pins on the alley in substantially their identical positions whereupon suction goes off because cam lever rides off the high portion of cam 144 and the pins are released.

Since cam 186 is engaging lever 195 in this particular phase of operation of the machine, the table indexing mechanism will remain inoperative during the movement of the table up and down because of the low portion engaged by lever 195. At the same time, suction valve control lever 121 will have no motion because it rides on the low portion of cam 141 and hence no suction will be turned into the spotters. With the return of the standing pins to the alley in respotted positions and the elevation of the table with a concurrent rotation of the several cams through 180°, the first cycle of the machine will have been completed and hence it will be seen that for each ball thrown it will cause the machine to operate through an entire cycle.

If, upon the throwing of the next ball of the allowed number of balls per frame, pins still remain standing, the table T travels downwardly to the alley and finds pins remaining upright thereon. If the game being played is a two ball per frame game, the standing pins will not be relifted and respotted. Consequently, lever 121a rides on a dwell portion of cam 144 and no suction can be conducted to the respotting units U so that the pins will not be lifted. Hence, when the table rises the sweep will sweep the standing pins and "deadwood" into the pit. As the table rises, cam 189 engages lever 267 to set into operation the mechanism for feeding pins to the setters of the table and as the table reaches its upward limits, a new set of pins is placed in the setters, whereupon by means of cam 141 suction is created in the setter units S to hold the pins firmly while the pin transfers 42 retreat and return to their original positions. At the same time suction is turned on in the respotting units U because of the engagement of the lever 121a with a high portion of cam 144 which causes the resetters to be held against lateral movement for support on the table and thereby prevent them from shifting around during the indexing of the table which is caused by the engagement of bump 3a of cam 186 with lever 195 in order to position the pins for delivery on the alley. Therefore, with suction on in both setters and resetters, the table T with the pins in the setters S descends to the alley, the pins are located thereon, and due to the engagement of lever 121 with a low portion of cam 141, suction is cut off, the pins are freed and remain standing on the alley when the table rises. Suction, however, remains on in the respotters because the table must be again indexed through 180° in order to present the setters for another set of pins. The suction remains on until the table rises and is indexed by engagement of lever 195 with bump 4a of cam 186 whereupon lever 121a rides off the high portion of cam 184 and suction is cut off thereby closing the second cycle.

In a spare the same operations are carried out except that when the table is lowered to test for the presence or absence of standing pins after the throwing of the second ball of the allowed number per frame, a spare signal 375 will be energized to apprise the player of the status of his play. All of the several levers and cams described above operate similarly and the machine is in operation for two cycles.

At the conclusion of any cycle a new set of pins is placed on the alley bed and remains standing thereon. The several control levers are placed in position with cams 141, 144, 186 and 189, if therefore, when the first ball is thrown and all of the pins are knocked down a strike results.

The arrival of the ball in the pit at the end of the alley starts the operation of the machine and causes the table T to be lowered to perform its function of testing to determine the absence or presence of standing pins. The downward movement of table T causes switch members 345, 347 to close (Figures 35 and 39). At this time suction has been created in the several resetting devices and since no pins are found standing, the circuit 323 is closed because of the closing of the several contacts 320 by movement of pistons 301 in brackets 300 (see Figure 20), and if desired a strike signal 377 can be used to inform the player that all pins have been knocked down by the first ball. The removal of all pins from the alley by a single ball causes the energization of solenoid 160 which unlatches one of the control pins 164 so that it engages cam surface 182 of lever 178 forcing the lever in a counterclockwise direction (Figure 13) so that all of the cams 141, 144, 186 and 189 are shifted out of engagement with levers 121, 121a, 195 and 267 and cams 143, 146, 188 and 191 take their places. Table T is then elevated and because levers 121 and 121a engage low portion of cams 143 and 146, suction is cut off in both the setters S and resetters U during the elevation of the suction table to pin receiving position. Substantially simultaneously with the energization of solenoid 160 the pin setter control mechanism is activated to feed a new set of pins to the setters, and when the pins have been located in the setters S because of the engagement of levers 121 and 121a with high portions of cams 143 and 146, the pins are gripped in the setters by suction and the resetters U are held against lateral shifting during the indexing of the table because of the engagement of lever 195 with bump 1 of cam 188 which switches the pins from receiving to pin delivery position above the alley. The table is lowered with suction on in both setters and resetters and after the pins have been located on the alley, suction is cut off in the setters to free the pins on the alley because lever 121 rides on to a low portion of cam 143 and closes valve V₁. Suction remains on in the resetters. The table T is elevated to its upper limits, and at that position lever 195 engages bump 2 of cam 188 and indexes the table to its original position with the pin setters located for receiving a new set of pins. Then, because of the movement of lever 121a downwardly, as it travels off a high portion of cam 146, suction is cut off in valve V₂. During this series of operations, star wheel 255 has been moved because of its engagement with pin 164 when the strike was registered. This means that lever 260 has run off a high portion of cam 258 on to a low part thereof whereupon because of the coaction of projection 265 of lever 262 and pin 266 of lever 178, lever 178 is prevented from moving backward its entire stroke and is locked in intermediate position. This causes a shifting of cams of the several cam assemblies so that cams 143, 146, 188 and 191 are moved out of coaction with control levers 121, 121a, 195 and 267, respectively, and cams 142, 145, 187 and 190 are positioned for engaging these levers instead. This concludes one cycle of the machine and a one-half revolution (180°) turn of the several cams described. If on the next cycle a ball is thrown and another strike results, the table T will be lowered causing the machine to be set into operation by the arrival of the ball in the alley bed, suction will be on and circuit 320 closed, as above described. The fact that no pins are standing will be communicated to the player by an annunciator operated by circuits 317 and 320 operated in association with the resetting devices U, and certain elements of the machine will be set into operation as described above. Due to the engagement of the selected pin 164 with cam 182 of lever 178, the cam groups will again be shifted on shafts 117, 185 so that cams 143, 146, 188 and 189 will again be moved to engagement with levers 121, 121a, 195 and 267, respectively. The table is raised, the suction off, both in the setters and resetters, a new set of pins is placed in the setters whereupon valves V1 and V2 are opened by levers 121 and 121a riding on high portions of cams 143 and 146 so that pins are again held in the setters and the resetters are fixed against lateral movement on the table T which is turned and then lowered, pins are located on the alley bed, and the suction is cut off in valve V1, freeing the pins, as described above, while suction remains on in the respotters. The table is then moved to its uppermost position, bump 4 of cam 188 is engaged by lever 195 to index the table to pin receiving position, suction is cut off in the resetters, and by means of spring 194 bearing against cam assembly 184 lever 178 is shifted to its full stroke which also shifts the several cams 141 and 144, 186 and 189 for engagement with levers 121, 121a, 195 and 265, respectively. This concludes the second cycle and the machine is set into operation as it was in the beginning of this description.

Figures 40, 41, 42 and 43 show diagrammatically the sequence of operations taking place in my machine depending upon whether a player makes a strike or a spare or completes the throwing of the allotted number of balls per frame with pins standing on the alley. According to Figure 40, the first ball has been thrown resulting in a strike or knocking down of all of the pins of the frame, guard 401 has been lowered, the pin setter table T (showing only diagrammatically among pin setters S and resetters U) has been moved from position 1 to a point adjacent the alley and having found no pins standing has moved back up to position 2 where a new set of pins is placed in the setters S whereupon the table T is turned through 180°. Following the upward movement of the pin setter table, sweep 402 moves into operation and removes all "deadwood" from the alley, and the pins and/or balls are returned to storage M, and the player, respectively, by mechanism (not shown) which may take the form of that disclosed in my co-pending application, Serial No. 260,901 above referred to, which mechanism operates in timed relationship, guard 401 and sweep 402. The table is then moved downwardly to locate new pins on the alley, relays them, moves upwardly to its uppermost position and turns through 180° again to relocate the setters in pin receiving position. Guard 401 and sweep 402 are moved clear of the alley and the machine is ready for further play. The several actions, above described, take place during one cycle of the machine.

According to Figure 41 the first ball has been thrown and pins remain standing, whereupon when the table T is moved downwardly the standing pins are lifted, the guard 401 has been moved into position adjacent the alley prior to the lowering of the table, the annunciator indicates which pins remain standing, and after the standing pins have been raised above the alley, the sweep 402 removes all fallen pins or "deadwood" whereupon the pins to be respotted are replaced upon the alley because of the downward movement of the table and the cutting off of suction in the respotters U. The table with the respotters travels up, and guard 401 and sweep 402 are raised from the alley bed leaving the replaced pins standing on the alley.

In the second cycle, as shown in Figure 42, a spare is made because all the pins are knocked down by the second ball thrown along the alley bed. The arrival of the second ball on the pit elevator (see Figure 46) causes the sweep and rake to be lowered, the table T with respotters U again travels downwardly, tests for standing pins and finds none, the annunciator indicates a "spare," and the table then moves upwardly whereupon a new set of pins is placed in setters S. In the meantime sweep 402 has traveled along the alley bed and removed "deadwood" therefrom. The sweep then takes its inoperative position adjacent the guard 401, table T is indexed (as shown in Figure 42) to place the setters above the alley in proper position to deposit pins thereupon, the table travels down, suction is cut off, and the pins are left standing as the table travels upwardly. In its uppermost limits the indexing mechanism is again set into operation and the table is turned through 180° to relocate the setters to receive another set of pins when occasion demands. The guard 401 and rake 402 then travel upwardly to inoperative position, the second cycle concludes and the machine is ready for further play.

The second cycle of the machine, in such a case, is shown diagrammatically in Figure 42 wherein all of the remaining standing pins are felled by the second ball. The guard 401 is moved into its operative position, the table is lowered, and since there are no pins to be lifted, it moves back to its initial position above the alley, whereupon sweep 402 comes into operation to sweep the "deadwood" into the pit. A new set of pins is placed in the setters, the table is turned 180° to position the pins over the alley bed, whereupon it is lowered, the pins are released in playing arrangement, the table moves up and is turned through 180° to reposition the setters in receiving position. Following this the sweep and guard are raised and the cycle is concluded with a new set of pins arranged ready for further play. It will be seen, therefore, that the above description covers the operations of the machine whenever a spare has been made and it will be seen that two cycles are necessary.

In the event that neither a strike nor a spare is made, there will be pins standing on the alley after the second ball has been thrown so that the second cycle of the machine will be as shown in Figure 43 in which guard 401 has been brought into adjacency with the alley bed, resetters U move into testing position with respect to standing pins, whose presence and position is made known by the annunciator, but since there is to be no further play with the standing pins, suction is not turned on in the resetters and they return to their uppermost position leaving the pins standing on the alley. Sweep 402 moves across the alley and sweeps all standing pins and "deadwood" therefrom into the pit. In the meantime a new set of pins has been fed to the setters, table T is turned through 180°, lowered, pins are arranged in playing position on the alley bed, suction in the setters is released to free the pins, the table ascends to its uppermost position and is indexed 180° to reposition the setters in pin receiving position whereupon sweep 402 and guard 401 are lifted clear of the alley and the machine is ready for a new cycle and further play.

Figure 39 shows a suitable wiring diagram for operating the electrical control and indicating devices of my invention. One-revolution clutches K, K₂ and K₁, which may be of the well-known Bliss type, operated by solenoids 561, 556 and 355, respectively, are employed to operate several parts of the machine. Solenoid 561 controls the operation of the mechanism which feeds pins from the pit to magazine M; solenoid 556 is set into operation by the arrival of a ball in the pit and starts the machine by transferring the drive from motor 640 provided with sprocket 645 on shaft 646 through sprocket chain 647 tracking sprocket 648 which becomes coupled to shaft 643 to drive the machine. In a like manner whenever shaft 638 is driven due to the operation of solenoid 355 through clutch K₁, the pin transfer mechanism 42 is set into operation to feed pins from the magazine to the setters S. Since these mechanisms are shown and described in my above referred to co-pending application and form no specific part of this invention further detailed description and showings are deemed unnecessary.

When the magazine M is fully loaded and all switches 564 are closed by pins in the magazine, a current will pass through wire 557 leading through a relay 558 thereby energizing it and causing switch 559 to open the circuit 560 leading to solenoid 561 thus deenergizing it and allowing armature 562 to drop. This operation throws clutch K out of engagement with the drive shaft 53 for the loading mechanism, and discontinues the feed of pins from the pit to the magazine M. The arrival of a ball B in the pit closes switch 551 in a circuit 552 which leads through relay 553. Switch 563 having been closed by the movement of the armature 562 of solenoid 561, the energizing of relay 553 causes switch 554 to close and current passes through circuit 555 to energize solenoid 556 to connect the drive from motor shaft 646 to shaft 643 to start the machine.

The pin resetting devices U are utilized to detect the presence or absence of pins standing on the alley after the throwing of a ball, so that the operation of the machine may be controlled accordingly. They may also be used to control the light system which indicates the result of each ball thrown.

Assuming that the magazine is full of pins, and a set of pins is standing on the alley, the first ball is thrown. In Figure 39, switches 320 of the respotters are shown connected in series. Hence, if a strike is made, the table T is lowered, no pins are found standing, and suction is cut on through conduit 91 in the manner described hereinabove to move plungers 301 to close switches 320 (Figure 20) and make circuit 323. Current flows through sliding contacts 348, 344 and 332, 329, shown diagrammatically in simplified form in Figure 39, reference being made to Figures 34 to 38, which show details thereof, along wire 361 to a relay 351 which is energized to close a switch 352, thereby passing a current through wire 362 to solenoid 160 whereupon armature 161 connected to lever 162 rocks the arm to locate cam face 162c in position to engage a latch 163 on turret 165 and unlock a strike control indexing pin 164. At substantially the same time current passes through wire 363 to wire 364 and relay 353 is energized to close a switch 354 and pass current through a wire 365 to solenoid 355, which upon being energized causes armature 356 to rock lever 357 pivoted thereto out of the path of clutch control member 358 so that the clutch K₁ is thrown into operation to effect the feed of a new set of pins P from storage M by means of carriages 42 (Figure 1).

As stated above, the resetter units U each carry means for operating indicating means on the annunciator board SB to acquaint a bowler with the results of each ball thrown. Figure 39 also shows diagrammatically an annunciator or score board SB having ten signals, such as lights (1 to 10, inclusive) arranged in triangular formation similar to the order in which pins are spotted on the alley. There are also two additional signals, one to illuminate a sign reading "strike" and the other to illuminate a sign reading "spare." Circuit A furnishes current for operating solenoids 160, 355, 556 and 561, above described. Circuit B is a signal circuit and circuit C furnishes current for operating the several relays.

In the case of a strike as discussed above, when a ball B lands in the pit and closes switch 551, it also causes switch 365a to be closed by the energization of relay 351 whereupon current flows through line 367 energizing relay 368 which closes switch 369 in circuit 370 and current flows through the signal light 377 thereby indicating a strike.

If less than ten pins are felled by the first ball thrown, the machine will continue in its normal operation, although the table moves down and the annunciator is operated to indicate which pins remain standing, as described below. Upon the throwing of the second ball, however, when the table T is moved downward and finds standing pins, or in case of a spare where all pins are knocked down by the second ball, a cam 190 on shaft 185 moves into engagement with lever 267 which engages switch 270, breaks the circuit through wire 361 thereby deenergizing relay 351 and breaking the circuit through wire 362 to solenoid 160, and strike signal line 367. At the same time switch 270 has closed the circuit through wire 364, thereby energizing relay 353 and causing switch 354 to again make a circuit through wire 365 and energize solenoid 355 for the purposes described above.

In the event that the first ball fails to knock down all the pins as the table T descends, any standing pins will enter its respective spotter unit U and as the head of the pin enters the respotter and the table T settles in its final downward movement, the heads of the standing pins will lift the respective respotters away from their positions on bottom plate 97 and against the underside of top plate 96 as shown in Figure 21. When in this position suction has been admitted automatically and as gasket 224 seals the top of the respotter against the plate 96, and the head of the pin P is sealed in the respotter, the suction will hold the respotter in a firm grip while the table T is raised in order to permit the alley to be swept clear of fallen pins. With the respotters and pins in the position just described, in addition to having admitted suction, it has also caused switches 316 in the respotters which hold pins to close circuit 317 for these respective respotters.

Assuming for example that only pin, say No. 9, is left standing, the circuits leading to the signal light representing No. 9 on the score board would operate as follows:

As pin No. 9 (Figure 39) closes switch 316, current passes through sliding switches 344, 345 and 340, 341 through wire 317 and the switch 316 to relay 400 which closes circuit 401 so that current flows through wire 317b which leads to signal No. 9 on score board SB. This signal will light up indicating that pin No. 9 was left standing on the alley. Similarly any pins left standing on the alley would cause their respective signals on the score board to be lighted and their grouping on the alley to be visualized on the board.

If the bowler should succeed in knocking down the remaining pin or pins with a second ball the circuits leading to the score board would operate as follows:

As the pin setter table T descends and the respotters U fail to contact any standing pins, the pistons 301 assume neutral positions (as shown in Figure 22), suction having been cut off leaving the piston balanced between springs 306 and 308. Both switches 316 and 320 will, therefore, remain open and current C will pass through wire 317 to switch 270 which has been closed by cam 190 as the table T reached its lowermost position. From switch 270 the current passes by wire 317a to switch 271 which has also been closed by the cam 190 as the table T reaches its lowermost position. From switch 271 the current passes through wire 390 and switch 371 to relay 372 to close switch 374 in circuit 376. Current passes through circuit 376 and operates signal 375 which illuminates a sign reading "Spare." Switch 371 which is normally closed will be opened when any of the signals representing a pin standing on the alley is lighted, as in the case of pin No. 9, cited above. The current B passes through wire 379 and through signal No. 9 in the annunciator to a relay 371a which is energized and opens switch 371 thus breaking the line 370 which controls the circuit leading to signal 375 of the score board. In this event signal 375 will, therefore, remain unlighted.

In case the bowler fails to obtain a "spare" the circuit would operate as follows:

When the pin setter table descends, the respotter U contacts any pins left standing and as a result the switches 316 corresponding to these pins will be closed and current will pass through circuits 317, as was described in the case of the No. 9 pin left standing and the signals representing the pins left standing will thus be lighted. Hence it will be seen that any results obtained by the bowler on any ball will be recorded progressively on the score board, and in the case of pins left standing their number and grouping will be visualized for each ball thrown. A circuit breaker 380 is placed in circuit C to shut out the lights on the score board so as to be ready to record the results of the next ball thrown.

It is also within the contemplation of this invention to acquaint a player as to which pins have been knocked down by each ball thrown and for that reason if desired suitable means may be provided for actuating signals such as lights corresponding to the positions of the fallen pins. This can be accomplished by any suitable mechanism as by reversing the circuit connections. For example, all the lights could go on when a strike is made and circuit 323 completed.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. In a bowling pin setting machine, the combination with an alley bed, of a pin handling conveyor comprising, a plurality of spaced elements mounted on said conveyor, electric control devices associated with each of said elements, a circuit connecting said devices, means for closing said circuit for operating said conveyor to set a new frame of pins if all of the pins standing on said bed are knocked down on the throwing of a single ball, and means for preventing completion of said circuit if less than a full frame of standing pins are knocked down by the first ball.

2. In a bowling pin setting machine, the combination with an alley bed, of a pin handling conveyor comprising a plurality of pin handling elements mounted in spaced relation on said conveyor, electric control devices carried by each of said elements, means for moving said conveyor to and from said alley bed to set and reset pins thereon, a normally open electric circuit, means for closing said circuit by movement of said conveyor after the throwing of the first ball of a frame if all of the pins are knocked down thereby, means for maintaining said circuit open by engagement of standing pins with said electric control devices if pins remain standing after the throwing of the first ball, and selectively operated means controlled by said electric control devices for determining the movement of said setting device.

3. In a bowling pin setting machine, mechanism for setting upon a bowling alley pins which have been left standing thereon after the delivery of a bowling ball comprising, a plurality of spaced respotting units, mechanism for setting the full number of pins upon said alley, and selective mechanism automatically operable by the presence or absence of pins on said alley after the throwing of a ball to determine which of said first two mechanisms is to be actuated, said last-named mechanism comprising electrically operated control means mounted on said units and arranged to detect the absence or presence of standing pins.

4. In a bowling pin setting machine, mechanism for resetting upon a bowling alley the pins which have been left standing thereon after the delivery of a bowling ball, mechanism for setting a new frame of pins upon said alley, and selective means automatically operable by the presence or absence of pins on said alley after the throwing of a ball for determining which of said mechanism is to be actuated, said means comprising devices coacting with said first-named mechanism and arranged to be engaged by standing pins.

5. In a bowling pin setting machine the combination with an alley bed, of mechanism for placing bowling pins on said alley bed in playing arrangement, said mechanism comprising, an elevator provided with pin setters on one side and opposed resetting devices on the other side, means for moving said elevator to and from receiving position and delivery position with respect to said bed, means associated with each of said devices for determining the presence or absence of standing pins on said alley after the throwing of a ball, and selective control means made operative by the presence or absence of standing pins on said bed when said elevator has been lowered to position said resetters adjacent said alley for advancing a new set of pins or resetting pins left standing after the throwing of the first ball.

6. In a bowling pin setting machine, an alley bed, mechanism for positioning pins in playing arrangement on said bed comprising an elevator, a support on said elevator, pin handling members mounted on said support, and means carried by each of said members for operation by movement of said elevator towards said alley dependent upon the presence or absence of standing pins after the throwing of a ball for selectively controlling the setting and resetting of pins by said machine.

7. In a bowling pin setting machine, the combination with an alley bed, of mechanism for placing bowling pins on said bed in playing arrangement, said mechanism comprising a turnable elevator, a plurality of bowling pin setters mounted on one side of said elevator, a plurality of bowling pin resetters mounted on the other side of said elevator, control devices associated with each of said resetters, means for moving said elevator to and from said alley bed, and selective means under the control of said devices for effecting the turning of said elevator.

8. In a bowling pin setting machine having a storage magazine, a pin handling device comprising a plurality of pin holders arranged to grip the head ends of pins for setting and resetting said pins on an alley, and means for transferring pins from said storage magazine to said holders, control mechanism for selectively effecting the movement of pins by said device to said alley comprising, a strike determining mechanism, a spare determining mechanism, a set of selectively operated control elements arranged to coact with said mechanisms, and means carried by said device for selecting a particular control element for operation with one of said determining mechanisms dependent upon the number of pins knocked down by the first or second ball of a frame thrown.

9. In pin handling mechanism for bowling pin setting machines, a turnable frame, means for turning said frame in a single direction, a plurality of bowling pin setting and resetting devices mounted on said frame, means mounting said devices on said frame in positions corresponding to the playing arrangement of pins, means forming a part of said devices for holding the top end of each pin, and control mechanism operated by the presence or absence of bowling pins standing on a bowling alley for controlling the movement of said frame.

10. In pin handling mechanism for bowling alleys, a frame, means for raising and lowering and turning said frame, a plurality of pin setting and resetting devices carried by said frame, suction mechanism connected with each of said devices for effecting the holding and handling of pins, control mechanism for selectively controlling the movement of said frame comprising, a strike registering unit, a spare registering unit, a pair of selectively controlled cams arranged to cooperate with said units, means for selecting a particular control cam for operation with one of said units dependent upon the number of pins knocked down by the first or second ball of a frame thrown, and suction cam control means also coacting with said control cams for controlling the introduction of suction in said devices.

11. A bowling pin setting machine comprising, an alley, a frame, means for raising, lowering and turning said frame, a plurality of suction operated pin handling devices mounted on said frame, control means for turning said suction on and off in said devices, mechanism responsive to the number of pins knocked down by a first ball or second ball controlling the turning movement of said frame, and connections between said suction control means and said mechanism for setting pins properly on said alley.

12. In a bowling pin setting machine, an alley bed, mechanism for positioning pins in playing arrangement on said bed comprising an elevator, a support on said elevator, pin handling members mounted on said support, and means carried by each of said members for operation by movement of said elevator towards said alley dependent upon the presence or absence of standing pins after the throwing of a ball for selectively controlling the setting and resetting of pins by said machine.

13. Bowling pin handling mechanism for a bowling pin setting machine comprising a shaft, a frame mounted on said shaft for movement relative thereto, bowling pin setters mounted on one side of said frame, bowling pin resetters mounted on the other side of said frame and facing outwardly therefrom, suction conduits connected to said setters and resetters, electric control devices associated with each of said resetters, and means rendered operative by the operation of said devices for controlling the operation of said setters and resetters.

14. In a bowling pin setting machine for use with a bowling alley having a pin supporting bed, mechanism for placing bowling pins in playing arrangement on said bed, comprising an elevator, laterally movable pin handling devices mounted on said elevator, means for moving said elevator to and from said bed to set and reset pins thereon, means associated with each of said devices for determining the presence or absence of on or off-spot standing pins after the throwing of a ball along said bed, and selective mechanism controlled by said last-named means operative according to the number of pins felled by a ball for controlling the operation of said machine to reset on or off-spot pins or effect delivery of a new set of pins to said bed.

15. In a bowling pin setting machine, an alley bed, and mechanism for placing bowling pins on said bed in playing arrangement, said mechanism comprising an elevator, floating pin handling devices mounted on said elevator, means for moving said elevator to and from said bed, means associated with each of said devices for determining the presence or absence of on or off-spot pins after the throwing of a ball over said bed, and selective mechanism controlled by said last-named means operative according to the number of pins felled by a ball for controlling the operation of said machine.

16. In a bowling pin setting machine for use with a bowling alley having a pin supporting bed, mechanism for placing bowling pins in playing arrangement on said bed, comprising an elevator, pin handling units mounted on said elevator, mechanism for moving said elevator to and from said bed to set and reset pins thereon, devices associated with each of said units for determining the presence or absence of on or off-spot standing pins after the throwing of a ball over said bed, and selective mechanism controlled by said devices for effecting delivery of a new set of pins to said bed if all pins are felled by the first ball thrown.

17. In a bowling pin setting machine for use with a bowling alley having a pin supporting bed, mechanism for placing bowling pins in playing arrangement on said bed comprising an elevator, individually movable pin handling units mounted on said elevator, mechanism for moving said elevator to and from said bed to set and reset pins thereon, said last-named mechanism including means operative after the throwing of a ball for positioning said units for engagement with any standing pins whereby to cause said standing pins to shift any unit engaged to conform with the position of the on or off-spot pin engaged, devices associated with each of said units for determining the presence or absence of on or off-spot standing pins after the throwing of a ball on said bed, and selective means controlled by said devices for effecting delivery of a new set of pins to said bed if all pins are knocked down by the first ball thrown.

18. In a bowling pin setting machine for use with a bowling alley having a pin supporting bed, mechanism for placing pins in playing position on said bed, comprising an elevator, pin handling units mounted on said bed, mechanism for moving said elevator to and from said bed to set and reset pins thereon, devices associated with each of said units for determining the presence or absence of on or off-spot pins standing on said bed after the throwing of a ball, and selective mechanism controlled by said devices for preventing a new set of pins from being delivered to said bed if less than a full frame of pins is knocked down by the first ball thrown over said bed during the playing of each frame.

19. In a bowling pin setting machine for use with a bowling alley having a bowling pin supporting bed, mechanism for setting and resetting pins on said bed comprising an elevator, pin handling units carried by said elevator, means mounting said units for individual lateral movement on said elevator, means for moving said elevator after the throwing of a ball for positioning said units in engagement with any standing pins to cause said pins to engage and move said units into positions conforming to the positions occupied by said standing pins whether on or off-spot, pin setting control devices operatively associated with each of said units for movement therewith, and control mechanism associated with said devices and operative in response to the presence or absence of pins standing as the result of the first ball of a frame thrown for selectively controlling the delivery of a new set of pins to said bed or the resetting of said pins on said bed in their respective on or off-spot positions.

20. Bowling pin setting mechanism for use with a bowling alley having a pin supporting bed constructed and arranged to support a plurality of conventional bowling pins in playing arrangement thereon, comprising a pin setting and resetting member movable to and from said bed, a plurality of pin handling units supported by said member for individual lateral movement thereon, individually operable detecting elements on each of said units for determining the presence or absence of on or off-spot pins standing on said bed after the throwing of a ball, and mechanism controlled by said elements for effecting the delivery of a new set of pins to said bed if all pins are knocked down by the first ball thrown.

21. Bowling pin setting mechanism for use with a bowling alley having a pin supporting bed constructed and arranged to support a plurality of standing pins in playing arrangement, comprising a pin setting and resetting member movable to and from said bed, a plurality of pin handling units on said member, means mounting said devices on said member for individual lateral movement, individually operative electric control devices on each of said units for determining the presence or absence of on or off-spot pins standing after the throwing of a ball, and electrically operated mechanism energized by said devices as the result of the felling of all pins by the first ball for effecting the delivery of a new set of pins to said bed.

22. Bowling pin setting and resetting mechanism for use with a bowling alley having a pin supporting bed arranged to support bowling pins in playing arrangement comprising a pin setting and resetting member, means for moving said member to and from said bed, a plurality of pin handling units carried by said member, means mounting said units for independent movement thereon, individually operated electric control devices supported by each of said units, including switch means operative in response to the absence of pins standing on said alley bed after the throwing of a ball, and electrically operated means energized by said switch means as the result of the felling of all pins by the first ball thrown for effecting the delivery of a new set of pins to said bed.

23. Bowling pin setting and resetting mechanism for use with a bowling alley having a pin supporting bed constructed and arranged to support a plurality of pins in playing arrangement, comprising a pin setting and resetting member, means for moving said member to and from said bed to set and reset pins and test for the presence or absence of pins standing as the result of a ball thrown, a plurality of pin handling units carried by said member, means mounting said units for independent movement thereon, individually operative electric control devices on each of said units, including switch means operative in response to the absence of pins on said alley bed after the throwing of a ball, electrically operated means energized by said switch means as the result of the felling of all pins by the first ball of a frame thrown for effecting the delivery of a new set of pins to said bed, and means for maintaining said switch means inoperative when pins remain standing on said bed.

24. In a bowling pin setting machine, the combination with an alley bed, of a pin handling conveyor comprising a plurality of spaced pin holding elements mounted on said conveyor, control devices associated with each of said elements, mechanism operating said devices for effecting the movement of said conveyor and the delivery of a new set of pins to said bed if all the pins standing are knocked down on the throwing of a single ball, and means for preventing the operation of said mechanism if less than a full frame of standing pins is knocked down by said single ball.

25. In a bowling pin setting machine, the combination with an alley bed, of mechanism for setting upon said bed pins left standing after the throwing of the first ball including individually movable resetter devices carried by said mechanism, an electric circuit, control means associated with each of said resetter devices connected in said circuit, means for moving said mechanism to engage said resetter devices with off or on-spot standing pins, each of said devices being individually movable by engagement with standing into aligned position conforming to the position occupied by each on or off-spot standing pin, and mechanism for operating said control means regardless of the positions occupied by said devices for effecting delivery of a new set of pins to said bed or causing standing pins to be reset on said bed.

26. In a bowling pin setting machine, the combination with an alley bed, of a pin handling conveyor comprising, a plurality of floating spaced pin holding elements mounted on said conveyor, electric control devices associated with each of said elements, a circuit connecting each of said devices, means for moving said conveyor to bring said elements into position to be engaged by any pins remaining standing after the throwing of the first ball and cause said elements to be shifted into positions conforming to the positions of standing on or off-spot pins, means for closing said circuit for operating said conveyor to effect the setting of a new frame of pins if all pins standing on said bed are knocked down by said first ball, and means operative regardless of the positions occupied by said elements on said conveyor to prevent completion of said circuit if less than a full frame of pins are knocked down by said first ball thrown.

27. In a bowling pin setting machine for use with a bowing alley having a pin supporting bed, a device for placing pins in playing arrangement on said bed, including a traveling support adapted to be moved to and from said bed to set and reset pins thereon, and a plurality of floating spaced pin holding elements mounted on said support, electrical testing means carried by each of said elements and displaceable therewith according to positions occupied by standing on or off-spot pins after the throwing of the first ball of a frame, a circuit connecting said testing means, means for closing said circuit for operating said traveling support to set a new frame of pins if all pins standing on said bed are knocked down by the first ball thrown, and means for presenting the completion of said circuit without reference to positions occupied by said elements if less than a full frame of pins are knocked down by the first ball thrown.

28. In a bowling pin setting machine, the combination with an alley bed, of a pin handling conveyor, a plurality of spaced pin handling elements mounted on said conveyor, mechanism for normally moving said conveyor to and from said bed to set a frame of pins thereon, travel above said alley bed and remain thereabove pending the throwing of the first ball, said mechanism including means operative when the first ball is thrown for moving said conveyor downwardly towards said bed to test for the presence or absence of standing pins as the result of the throwing of said ball, means operating said elements to lift any standing pins and subsequently reset the same in their respective on or off-spot positions for the throwing of the next ball, control devices associated with each of said elements, mechanism operating said devices for effecting the delivery by said conveyor of a new set of pins to said bed if all pins of a frame are knocked down by the first ball thrown, and means for preventing operation of said last-named mechanism and causing said conveyor to reset standing pins if less than a full frame are knocked down by said first ball.

29. In a bowling pin setting machine, the combination with an alley bed, of a pin handling conveyor, a plurality of spaced pin handling elements carried by said conveyor, mechanism for moving said conveyor cyclically to and from said bed to set a frame of pins thereon, travel away therefrom and dwell above said bed pending the throwing of the first ball, said mechanism including means operative after the first ball is thrown for moving said conveyor downward towards said bed into position to test for the presence or absence of standing pins as the result of the first ball thrown, and control devices associated with each of said elements operative if no standing pins are found for effecting the delivery of a new set of pins to said bed by said conveyor.

30. In a machine of the type defined in claim 29, mechanism for maintaining said control devices inoperative, means for causing said elements to grip any standing pins for lifting by said conveyor above said bed and return to their respective on or off-spot position each standing pin occupied prior to being lifted.

31. In a bowling pin setting machine, the combination with an alley bed, of a pin handling conveyor comprising a plurality of pin handling elements mounted in spaced relation on said conveyor, control devices carried by each of said elements, means for moving said conveyor to and from said alley bed to set and reset pins thereon, means on each of said elements operative upon downward movement of said conveyor after the throwing of the first ball of a frame if all pins are knocked down for operating all of said devices, means for maintaining said devices inoperative in those elements engaged by pins remaining standing after the throwing of the first ball, and selectively operated means controlled by said control devices for determining the movement of said conveyor.

32. In a bowling pin setting machine, mechanism for setting upon a bowling alley pins which have been left standing thereon after the delivery of a bowling ball comprising, a plurality of spaced respotting units, mechanism for setting the full number of pins upon said alley, and selective mechanism automatically operable by the presence or absence of pins on said alley after the throwing of a ball to determine which of said first two mechanisms is to be actuated, said last-named mechanism comprising control means mounted on each of said units and arranged to detect the presence or absence of standing pins.

33. In a bowling pin setting machine, mechanism for setting upon a bowling alley pins which have been left standing thereon after the delivery of a bowling ball comprising, a plurality of spaced respotting units, and means for mounting said units for individual movement to conform with the positions of pins standing on said alley after the throwing of a ball, mechanism for setting the full number of pins upon said alley, and selective mechanism automatically operable by the presence or absence of pins on said alley after the throwing of a ball to determine which of said first two mechanisms is to be actuated, said last-named mechanism comprising control means mounted on each of said units and movable therewith constructed and arranged to detect the absence or presence of on or off-spot standing pins.

34. In a bowling pin setting machine for use with a bowling alley having a pin supporting bed, mechanism for placing bowling pins in playing arrangement on said bed comprising, a traveling pin distributing member for setting and resetting pins on said bed, said mechanism including a plurality of pin resetting units operative after the throwing of the first ball to reset any pins left standing, an electric circuit, electric control elements in said circuit associated with each of said units for controlling the operation of said member in setting new pins or resetting standing pins, and mechanism operative in response to the movement of said member towards said bed after the throwing of a ball and the determination of the presence or absence of standing pins thereon for operating said elements to control said circuit to effect the delivery of a new set of pins or cause said standing pins to be reset on said bed.

35. In a bowling pin setting machine for use with an alley having a pin supporting bed, side supports, a pin handling device mounted for movement on said supports above said bed, a plurality of pin handling elements mounted in spaced positions upon said device, electric cables connecting said elements, a stationary switch member mounted adjacent said device, a complementary switch member mounted on said device and traveling therewith, and means to raise and lower said device to bring said switch members into engagement for completion of a circuit through said cables.

36. In a bowling pin setting machine, a bowling alley having a pin supporting bed constructed and arranged to support a plurality of pins in playing arrangement thereon, supports located adjacent the sides of said bed, slides mounted for movement on said supports, means engaging said slides, a pin handling device mounted on said slides above said bed for movement to and from said bed, a plurality of pin handling members mounted in spaced positions on said device, electrical means associated with each of said members for actuating said device, a stationary circuit closing element mounted adjacent said device, a cooperating circuit making element on said means traveling therewith, and means for moving said slides on said supports to a position proximate said bed for bringing said elements into circuit closing position for completing a circuit through said members.

37. In a bowling pin setting machine for use with an alley having a pin supporting bed, spaced side supports, a pin handling device mounted for movement on said supports above said bed, a plurality of pin handling elements mounted in spaced positions on said device, a series circuit connecting each of said elements, a stationary switch member mounted adjacent said device, a complementary switch member mounted in said device and traveling therewith, means to raise and lower said device to bring said switch members into engagement for cooperation of said circuit, circuit making switches associated with each of said elements, and means operative when all standing pins are knocked down by the first ball of a frame for moving said switches associated with said elements into circuit making positions.

38. In a bowling pin setting machine for use with an alley having a pin supporting bed, spaced side supports, a pin handling device mounted for movement on said supports above said bed, a plurality of pin handling elements mounted in spaced positions on said device, a series circuit connecting each of said elements, a stationary switch member mounted adjacent said device, a complementary switch member mounted in said device and traveling therewith, means to raise and lower said device to bring said switch members into engagement for cooperation of said circuit, circuit making switches associated with each of said elements, and fluid actuated means operative when all standing pins are knocked down by the first ball of a frame for moving said switches associated with said elements into circuit making positions.

39. Bowling pin setting and resetting mechanism for use with a bowling alley having a pin supporting bed arranged to support bowling pins in playing arrangement comprising a pin setting and resetting member, means for moving said member to and from said bed, a plurality of pin handling units carried by said member, means mounting said units for independent movement thereon, individually operated electric control devices supported by each of said units, including switch means operative in response to the absence of pins standing on said alley bed after the throwing of a ball, a normally open electric circuit connecting each of said switch means, fluid actuated means operative in response to the movement of said member towards said alley, and the felling of all pins by the first ball thrown for closing said circuit, and electrically operated means operative in response to the closing of said circuit for effecting the delivery by said member of a new set of pins to said bed.

RUPERT E. RUNDELL.